United States Patent [19]

O'Sullivan

[11] Patent Number: 5,127,041
[45] Date of Patent: Jun. 30, 1992

[54] SYSTEM AND METHOD FOR INTERFACING COMPUTERS TO DIVERSE TELEPHONE NETWORKS

[75] Inventor: Harry M. O'Sullivan, Red Oak, Tex.

[73] Assignee: Spectrum Information Technologies, Inc., Dallas, Tex.

[21] Appl. No.: 531,762

[22] Filed: Jun. 1, 1990

[51] Int. Cl.$^5$ .......................................... H04M 11/00
[52] U.S. Cl. ..................................... 379/59; 379/63; 379/98
[58] Field of Search ...................................... 379/58-60, 379/63, 98-100, 443, 444, 93, 96, 97, 281, 339, 353; 455/33

[56] References Cited

U.S. PATENT DOCUMENTS

| | | |
|---|---|---|
| 4,012,596 | 3/1977 | West, Jr. et al. |
| 4,568,800 | 2/1986 | Orikasa. |
| 4,658,096 | 4/1987 | West, Jr. et al. ............... 379/59 |
| 4,680,787 | 7/1987 | Marry ............................. 379/63 |
| 4,697,281 | 9/1987 | O'Sullivan ...................... 379/59 |
| 4,718,080 | 1/1988 | Serrano et al. ................. 379/59 |
| 4,737,975 | 4/1988 | Shafer. |
| 4,752,949 | 6/1988 | Steinbeck et al. .............. 379/61 |
| 4,759,059 | 7/1988 | Christensen. |
| 4,775,997 | 10/1988 | West, Jr. et al. |
| 4,837,800 | 6/1989 | Freeburg et al. ............... 379/59 |
| 4,837,812 | 6/1989 | Takahash et al. ............ 379/100 |
| 4,852,146 | 7/1989 | Hatcock et al. ................ 379/63 |
| 4,868,863 | 9/1989 | Hartley et al. ................. 379/93 |
| 4,887,290 | 12/1989 | Dop et al. ....................... 379/59 |
| 4,890,315 | 12/1989 | Bendixen et al. .............. 379/59 |
| 4,912,756 | 3/1990 | Hop ................................. 379/63 |
| 4,972,457 | 11/1990 | O'Sullivan ...................... 379/59 |
| 4,991,197 | 2/1991 | Morris ............................. 379/63 |

FOREIGN PATENT DOCUMENTS 2170977  8/1986  United Kingdom ............... 379/98

OTHER PUBLICATIONS

Excerpt from Digital Fundamentals 3rd edition, by Thomas L. Floyd, 1986, pp. 562-569.
Technical disclosure: Millicom Cellular Portable Telephone, Nov. 1984, pp. 1.5, 2.6, 2.18-2.21, 6.11-6.13.
Morrison & Dempsey Communications, 'AB3X Cellular Interface', owners manual, Nov. 1987.

*Primary Examiner*—James L. Dwyer
*Assistant Examiner*—Dwayne D. Bost
*Attorney, Agent, or Firm*—Sixbey, Friedman, Leedom & Ferguson

[57] ABSTRACT

A system for connecting a computer to both cellular and landline telephone systems is disclosed. A cellular modem has a single RJ-11 jack for interfacing either to a landline jack or to a signal processing cable connected to a cellular transceiver. The analog data transmission signals of the modem, which are compatible with landline "tip" and "ring" lines, are provided on the third and fourth pins of the RJ-11 connector. When the modem is to be used as a landline modem, the RJ-11 connector is connected directly to a standard landline telephone jack using an ordinary modular telephone wire. When used with a cellular transceiver, the modem generates transceiver operation commands according to a predefined generic command language which is not specific to a particular transceiver. The generic commands are transmitted in serial digital form on the fifth terminal of the RJ-11 connector. The signal processing cable acknowledges the commands received via a serial digital signal transmitted to the second terminal of the RJ-11 connector. The signal processing cable then transmits control signals to the transceiver, with the signals being appropriate to the type of cellular transceiver used, to produce the function requested by the modem's universal command.

91 Claims, 13 Drawing Sheets

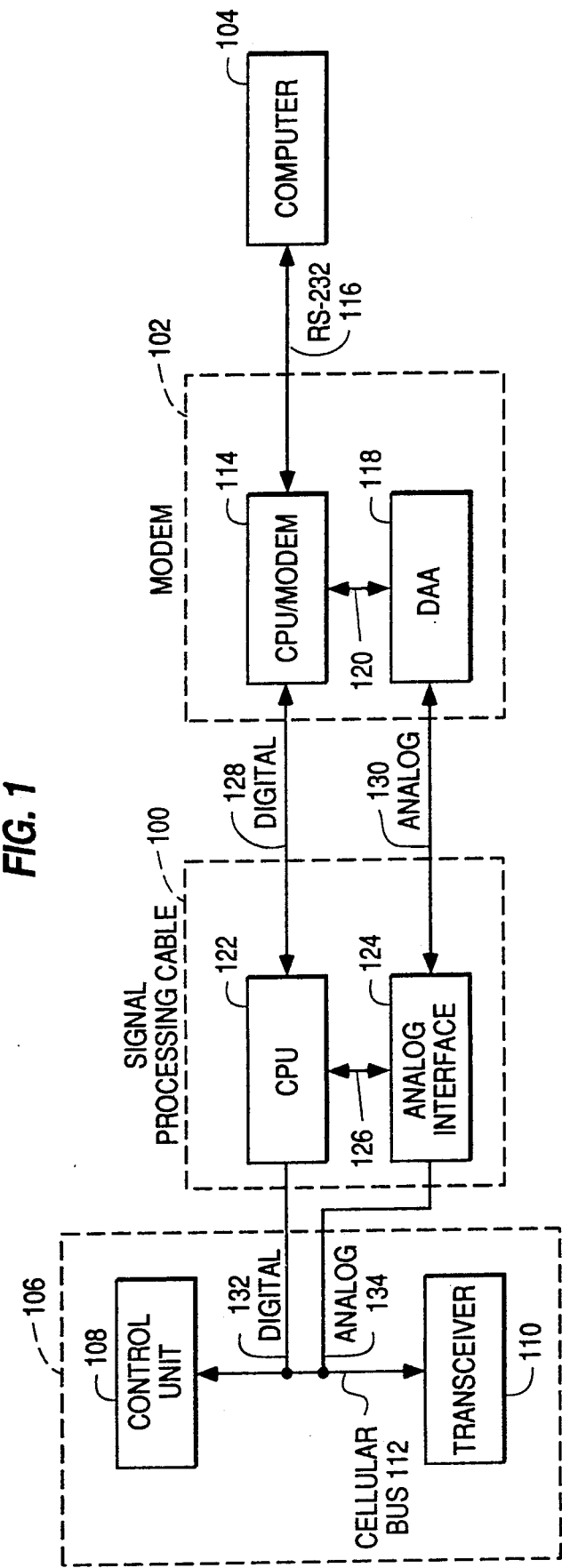

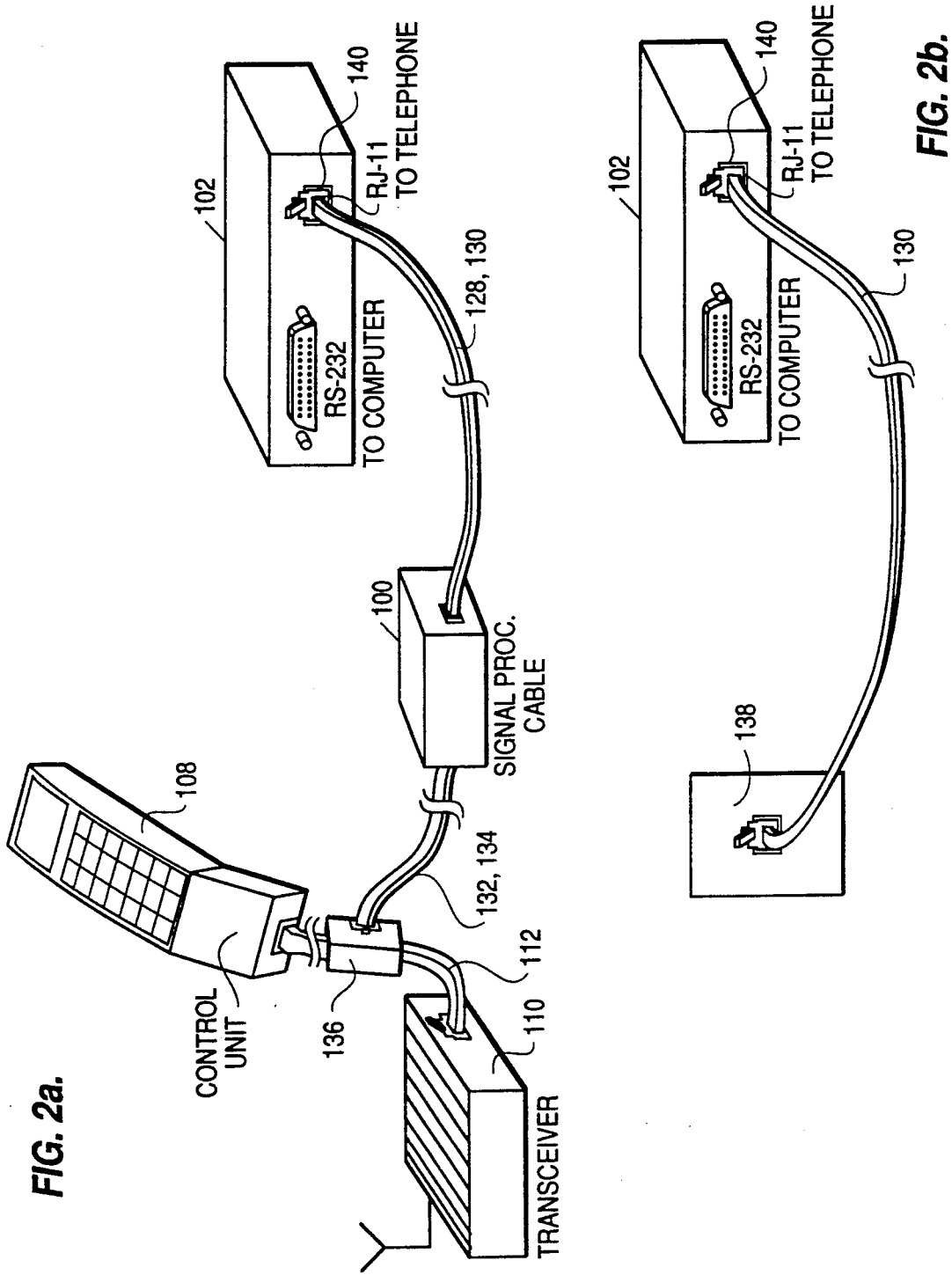

SYSTEM AND METHOD FOR INTERFACING COMPUTERS TO DIVERSE TELEPHONE NETWORKS

BACKGROUND OF THE INVENTION

The present invention is a novel modem and interfacing system that permits connection of a single cellular-capable modem to a variety of cellular transceivers or to a landline telephone jack.

In the prior art, modems specifically designed for cellular use were designed to connect to a single type of cellular bus. For example, the inventor's prior U.S. Pat. No. 4,697,281 describes one of the earliest commercially successful cellular modems. This modem includes integral interfacing software and hardware that is specific to the type of cellular transceiver used with the modem. Thus, a modem designed to work, for example, with a Motorola transceiver will not operate with an Oki transceiver. It would be desirable to develop a system that would permit a single, generic modem to operate with a variety of transceivers.

These prior art modems also are not designed to interface conveniently with a landline telephone jack. To interface with a landline telephone jack, these modems would have to be provided with separate landline connection hardware and operating software, adding cost and complexity. Because cellular modems are relatively expensive, it would be desirable to use a single modem for a variety of mobile and fixed-station data transmission tasks. The inability of a single modem to function easily in both environments is particularly troublesome when the modem is installed internally in a portable computer. If a portable computer is equipped with a modem that operates only in the cellular environment, an auxiliary modem must be provided to allow data transmission when the portable computer is used in an office setting. Similarly, if the portable computer's internal modem is not cellular-compatible, a separate cellular modem must be carried with the mobile unit. The need to carry a separate cellular modem with significant weight and dimensions reduces the convenience and portability, and thus the usefulness, of the portable computer/cellular telephone combination. Therefore, the lack of landline capability is a significant disadvantage for cellular modems.

The prior art includes systems which are distantly related to the system of the present invention, but none of these prior art systems provides a method of selectively connecting a single cellular-capable modem to a variety of cellular transceivers or to a landline telephone jack.

Some prior art interfacing systems, which will be referred to as telco emulators, permit operative connection of a variety of ordinary analog telephone sets to cellular transceivers by simulating a landline telephone connection. Such systems are disclosed in U.S. Pat. Nos. 4,737,975 to Shafer, 4,775,997 and 4,658,096 to West, Jr. et al., and 4,718,080 to Serrano et al. U.S. Pat. No. 4,012,596, also to West, Jr. et al., shows a similar system for connecting an ordinary telephone device to a simplex radio system. U.S. Pat. No. 4,887,290 to Dop et al. shows a cellular alarm backup system which can selectively connect either ordinary house phones or a digital alarm communicator to a cellular transceiver. It should be noted that, for reasons explained in the inventor's prior U.S. Pat. No. 4,697,281, an ordinary home or office modem will not function properly in a cellular environment.

Telco emulators have been used to connect modems to cellular transceivers. For example, U.S. Pat. No. 4,837,800 to Freeburg, et al. shows a telco emulator, the Motorola "CELLULAR CONNECTION," used to connect a cellular modem to a cellular transceiver. However, the telco emulator suffers from a high cost of production. These emulators must provide for Tip and Ring current, ringing voltage, and DTMF (touch-tone) reception and decoding. Each of these functions adds cost and complexity to the telco emulator. Further, the telco emulator must address the special dialing needs of the cellular transceiver, such as generating a SEND command. The telco emulator is also incapable of returning detailed status information and data from the cellular telephone to the connected device, since the telco emulator assumes that the device is not programmed to operate in a cellular environment. As a result of all these factors, the telco emulator method provides suboptimal control of the cellular transceiver in cellular modem applications as compared to the system of the present invention.

Radiotelephone interfacing systems not related to modems have also been developed in the prior art. U.S. Pat. No. 4,852,146 to Hathcock et al. shows an auxiliary dialing system that connects between a cellular handset and a cellular transceiver, but this system does not connect a generic device to a specific cellular transceiver. U.S. Pat. No. 4,752,949 to Steinbeck et al. discloses an interface system for connecting a cordless telephone to a base unit by installing a cord. The cord includes both data signal lines and control lines.

It is well-known in the landline PBX art to transmit both digital control and analog information signals through the same connector in a modular telephone wiring system. Some of these systems, as exemplified by the system disclosed in U.S. Pat. No. 4,759,059, allow ordinary analog telephone devices to connect to a digital telephone system. The analog devices then use analog lines of the telephone system but are not connected to digital control lines of the telephone system.

Finally, it is also known to connect a plurality of telephone units to one or more cellular transceivers, as illustrated in U.S. Pat. Nos. 4,890,315 to Bendixen et al. and 4,568,800 to Orikasa.

However, none of the prior art systems disclose a single, cellular-capable modem and cost-effective means that permit selective connection of the modem either to a variety of cellular transceivers or to a landline telephone jack.

SUMMARY OF THE INVENTION

It is a general object of the present invention to provide a novel system and method for accessing telephone networks of two or more differing types to communicate information using one of the telephone networks.

It is a general object of the present invention to provide a novel cellular modem system including a generic modem and a cellular transceiver-specific interface cable.

It is another object of the present invention to provide a novel cellular-capable modem which is adapted for ready connection either to a landline telephone jack or to a variety of cellular transceivers.

Another object of the present invention is to provide a novel interface cable device for connecting the aforementioned cellular-capable modem to a specific cellular transceiver.

A further object of the present invention is to provide a novel interface cable device adapted to connect a cellular-capable modem to a plurality of cellular transceivers.

It is a more specific object of the present invention to provide a novel cellular-capable modem which is provided with a single jack for connecting either to a landline telephone connector or to a variety of cellular transceivers.

Another object of the present invention is to provide a novel cellular-capable modem which can selectively transmit cellular transceiver control commands when the modem is connected to a cellular transceiver.

A further object of the present invention is to provide a novel cellular-capable modem that communicates with an interface cable connecting the modem and a cellular transceiver by using a generic command language, causing the interface cable to control the transceiver in a desired manner.

Yet another object of the present invention is to provide a novel interface cable which receives generic command language instructions from a cellular modem and produces signals adapted to control a cellular transceiver.

A further object of the present invention is to provide a novel modem for installation in a portable computer which can be used with either a cellular or a landline telephone system.

It is also an object of the present invention to provide a novel modem for installation in a portable computer which has a single connector permitting use of the modem with either a landline or a cellular telephone system.

An object of the present invention is to provide a novel modem for installation in a protable computer which produces generic command signals to control a cellular telephone connection.

It is also an object of the present invention to provide a novel system for interfacing a modem to a telephone system access device in which the modem transmits and receives generic command language signals to induce control of telephone system access device operation, and in which the generic command language signals are retransmitted if receipt of the signals is not acknowledged.

Another object of the present invention is to provide a novel interface device for connecting a cellular modem to a cellular telephone system including a control unit and a transceiver, which replaces a portion of a cellular bus connecting the control unit to the transceiver.

Yet another object of the present invention is to provide a novel system for connecting a cellular transceiver to a cellular data modem in which modulated data signals are carried on a first set of conductors and digital control signals are carried on a second set of conductors.

A further object of the present invention is to provide a novel system for interfacing a cellular modem to a cellular telephone which provides a signal imitative of a landline ring signal to the cellular modem when the cellular telephone signals an incoming call.

Another object of the present invention is to provide a novel cellular modem and a novel interface system for connecting the modem to a cellular telephone which communicate using a predefined command language and which generate signals acknowledging the receipt of command language signals.

A further object of the present invention is to provide a novel command language useful in arranging the interface between cellular modems and cellular telephone networks which includes commands for generating cellular telephone keypress signals and for obtaining cellular telephone status information.

It is also an object of the present invention to provide a novel system for sensing the connection of a cellular telephone interface cable to a cellular modem.

Another object of the present invention is to provide a novel system and method for establishing communication between a telephone system interface cable and a modem after these two devices are connected.

It is also an object of the present invention to provide a novel interface cable for connecting a cellular telephone to a modem which receives digital commands from the modem and controls thereby the operation of the cellular telephone and the transmission of computer data through analog computer data transmission lines connecting the modem to the cellular telephone.

These objects and others which will be apparent from the specification herein and the scope of the claims are achieved by providing a cellular modem having a single RJ-11 jack for interfacing either to a landline or to a cellular transceiver. The analog data transmission signals of the modem, which are compatible with landline "tip" and "ring" lines, are provided on the third and fourth terminals of the RJ-11 connector. When the modem is to be used as a landline modem, the RJ-11 connector can be connected directly to a standard landline telephone jack using an ordinary modular telephone wire.

If the modem is to be used with a cellular transceiver, the modem generates transceiver operation commands according to a predefined universal command language which is not specific to a particular transceiver. The modem's RJ-11 connector is connected to the cellular transceiver using an appropriate interface cable which includes a microprocessor (a "signal processing cable"). The universal language commands are transmitted in serial digital form on the fifth terminal of the RJ-11 connector. The signal processing cable acknowledges the commands received and alerts the modem to cellular-telephone-related events via a serial digital signal transmitted to the second terminal of the RJ-11 connector. The signal processing cable then transmits control signals to the transceiver, with the signals being appropriate to the type of cellular transceiver used, to produce the function requested by the modem's universal command.

The system disclosed has substantial advantages over prior art systems for interfacing modems to cellular and landline telephone systems. With the system disclosed herein, a single modem can be connected to a landline jack or to any desired brand of cellular transceiver merely by inserting the proper cable into the modem's RJ-11 jack. The single, familiar jack design is foolproof in that it allows the user to confidently and successfully connect the modem to a desired telephone system with minimal instruction or technical understanding of modem operation.

Further, the provision of a universal command language permits the modem to be designed independently of the specifications of the cellular transceivers to which it will be connected. The signal processing cable provides a consistent interface for the modem. Economies of scale will result from producing only one type of modem, rather than making a different modem for each cellular transceiver standard. In addition, the design of the present system will allow the manufacturer to respond faster and more cost-effectively to the introduction of new cellular transceiver standards since these new standards will only require design of a new signal processing cable. While telco emulators also offer the advantage of providing a consistent interface for the modem, these emulators are more complex and thus more expensive to produce than the system of the present invention. These emulators also provide less effective control over the cellular transceiver.

The universal command language also allows the same modem to be used with an infinite variety of cellular transceivers by merely substituting a different signal processing cable. Thus, a modem owner who obtains a new cellular telephone need only purchase a relatively inexpensive signal processing cable, rather than replacing the entire modem.

In addition, a single modem that can operate through a single jack in both landline and cellular environments will be particularly useful in portable computer applications, where space for additional jacks is limited and additional packages, such as extra modems, are quite undesirable.

Other objects and advantages of the present invention will become apparent to those skilled in the art upon review of the specification and drawings herein.

BRIEF DESCRIPTION OF THE DRAWINGS

FIG. 1 is a block diagram showing the operational connection of the modem and signal processing cable of the present invention.

FIG. 2a is an assembly diagram showing the connection of the signal processing cable of the present invention between a cellular transceiver and the modem of the present invention.

FIG. 2b is an assembly diagram showing the connection of an ordinary modular telephone cable between a landline telephone jack and the modem of the present invention.

DETAILED DESCRIPTION OF A PREFERRED EMBODIMENT

Figure 2C:
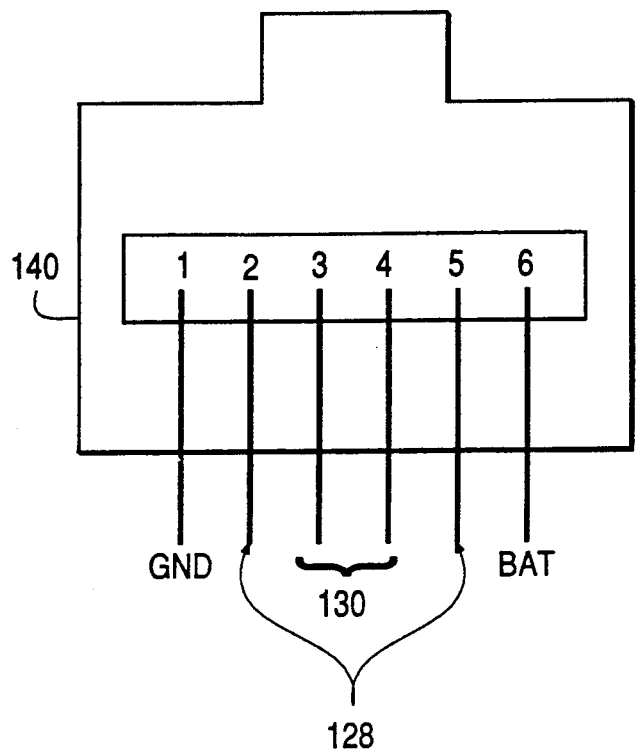
FIG. 2c is a diagram of a standardized, unitary electrical connector used, as shown in FIGS. 2a and 2b, to connect the modem of the present invention to landline telephone systems or to other types of telephones systems.

Referring first to FIG. 1, the data interfacing system of the present invention comprises two unitary component devices: a signal processing cable 100 and modem 102. The signal processing cable 100 and modem 102, and associated cabling, connect a computer 104 to a cellular telephone 106. Cellular telephone 106 may be any known type of cellular telephone and includes a control unit 108 connected to a cellular transceiver 110 by a cellular bus 112. The modem 102 includes a CPU/modem section 114, which may be connected to the computer 104 by an RS-232 interface cable 116. The CPU/modem section 114 is connected to DAA section 118 by analog signalling and digital control lines 120. The signal processing cable 100 includes a CPU section 122 and an analog interface section 124, connected by digital control lines 126. The CPU 122 of signal processing cable 100 is connected by digital data lines 128 to the CPU/modem section of modem 102. The analog interface section 124 of signal processing cable 100 is connected by analog data lines 130 to the DAA section 118 of modem 102. The CPU section 122 of signal processing cable 100 is also connected by digital data lines 132 to digital data lines of the cellular bus 112. The analog interface section 124 of signal processing cable 100 is connected by analog data lines 134 to analog transmission lines of the cellular bus 112.

If the modem 102 is used to connect to a cellular telephone network (not shown) using the cellular transceiver 110, the CPU/modem section 114 of modem 102 will generate generic cellular telephone operation commands according to a predefined universal command language, which is not specific to a particular cellular telephone 106. Some of these generic command language commands may be specifically designed to function only with a subset of the existing body of cellular telephones, but by the term "generic command language" it is meant that at least some of the commands will be generic. The generic command language signals are transmitted as serial digital signals over digital data lines 128 to the CPU 122 of signal processing cable 100. The CPU 122 of signal processing cable 100 is programmed to acknowledge the commands received via another serial digital signal transmitted on digital data lines 128. The signal processing cable 100 then generates device-specific command language signals which are transmitted via digital data lines 132 to the cellular bus 112. These device-specific command language signals are designed to emulate signals produced by the control unit 108 to produce desired control functions of transceiver 110 according to the generic command language command that was received from CPU/modem section 114 of modem 102.

The modem 102 of the present invention can be used with either a cellular telephone system or with a landline telephone system. In FIG. 2a, use of the modem 102 with a cellular telephone system is illustrated. The modem 102 is shown connected via signal processing cable 100 to a three-way connector 136 interposed in cellular bus 112. In FIG. 2b, the modem 102 is shown connected to a landline telephone system. For landline use, the modem 102 is connected via an ordinary modular telephone cable containing analog lines 130 to a landline RJ-11 jack 138. As shown in FIGS. 2a, 2b, and 2c, modem 102 is provided with a standard 6-position RJ-11 jack 140 for connecting either to the landline telephone jack 138, or to the cellular bus 112 via the signal processing cable 100. The six terminals of the RJ-11 jack carry the signals indicated in Table A. The method developed to transmit signals from the modem 102 to the signal processing cable 100 and the assignment of signals to terminals, as shown, is a novel feature of the invention and has particular utility. The modulated data signals that are to be transmitted and received by the modem 102 are transmitted and received on the TIP and RING lines. These lines are assigned to pins three and four respectively of the RJ-11 jack 140. The assignment of the analog data signals to transmission lines separate from control data transmission lines, and particularly to the terminals three and four, which correspond to the TIP and RING terminals used by landline RJ-11 connections, allows the RJ-11 jack 140 of the modem to be connected directly to the landline telephone jack 138 using a standard modular line cord as shown in FIG. 2b. In the preferred embodiment, the TIP and RING lines are not provided with a DC signal by the signal processing cable, but of course a DC level signal could be added if desired.

The GND signal on pin 1 of the RJ-11 jack 140 serves as a reference ground for all the analog and digital signals carried through the RJ-11 jack 140. The BAT voltage is provided directly from the cellular telephone bus 112. The voltage and current provided on the BAT terminal will vary depending on the model of the cellular telephone 106. Typically, the cellular bus 112 will provide the BAT terminal with at least 120 mA at 7.5 volts DC. The BAT signal in some cases may also be switched on and off by the cellular telephone 106.

TABLE A

| PIN | RJ-11 ELECTRICAL CONNECTIONS FUNCTION |
|---|---|
| 1 | GND - common ground |
| 2 | SCOUT - serial data from signal processing cable |
| 3 | TIP - signal processing cable analog transmit |
| 4 | RING - signal processing cable analog receive |
| 5 | SCIN - serial data to signal processing cable |
| 6 | BAT - signal processing cable provided DC voltage |

When the modem 102 is to be used in a cellular environment, as shown in FIG. 2b, the SCOUT (Serial Cable OUTput) and SCIN (Serial Cable INput) serial digital data signals on pins two and five of the RJ-11 jack 140, respectively, are used to transmit the generic command language signals. The SCOUT and SCIN lines thus correspond to the digital data lines 128 shown in FIG. 1. The transmissions on SCOUT and SCIN might be programmed to occur regardless of whether the modem 102 is being used in a cellular environment, but it is preferred that these transmissions occur only when the signal processing cable 100 is connected to the modem 102.

The preferred serial commands transmitted between the signal processing cable 100 and the modem 102 on the SCIN and SCOUT lines are shown in Table B. As shown, each command code consists of two hexadecimal digits which combine to form a single byte code. Naturally, numerous other command codes of varying types and lengths could be assigned to the functions shown, and additional desired functions could be implemented. For example, the descriptions of the command functions in Table B could themselves be transmitted in ASCII form as English-language command codes.

TABLE B

| GENERIC SIGNAL PROCESSING CABLE COMMAND LANGUAGE | |
|---|---|
| COMMAND (HEX) | FUNCTION |
| 00 | Smart Cable Acknowledge (SCACK) |
| 01 | Emulate keypress "1" |
| 02 | Emulate keypress "2" |
| 03 | Emulate keypress "3" |
| 04 | Emulate keypress "4" |
| 05 | Emulate keypress "5" |
| 06 | Emulate keypress "6" |
| 07 | Emulate keypress "7" |
| 08 | Emulate keypress "8" |
| 09 | Emulate keypress "9" |
| 0A | Emulate keypress "0" |
| 0B | Emulate keypress "SEND" |
| 0C | Emulate keypress "END" |
| 0D | Emulate keypress "LOCK" |
| 0E | reserved for future use |
| 0F | Modem acknowledge (MACK) |
| 10 | Data call initiate |
| 11 | Put cellular phone ON HOOK |
| 12 | Take cellular phone OFF HOOK |
| 20 | Status information request |
| 21 | Status information response |
| 22 | Display information request |
| 23 | Display information response |
| 24 | Debug request |
| 55 | Alert information |

As a particular feature of the invention, all commands transmitted will be acknowledged with either the SCACK or MACK signal, as appropriate, when execution is complete. If a command has not been acknowledged within three seconds, the device sending the command (either the modem 102 or the signal processing cable 100) will assume that the transmission was garbled and retransmit the information. If the device that is to receive the information fails to respond after three consecutive transmissions, the transmitting device will assume that the other device is disconnected or turned off. The transmitting device will then cease attempts to communicate and generate a signal informing the user or the computer of the failure. For example, if the signal processing cable 100 fails to respond to the modem 102 three times in a row, the modem may send a signal to the computer 104 indicating that the modem 102 is not connected to the cellular telephone 106. Or, the modem 102 could energize a display device such as a light-emitting diode.

The "emulate keypress" commands to the signal processing cable 100 (01-0D) direct the signal processing cable 100 to generate signals to the cellular transceiver that are equivalent to the signals generated by the cellular control unit when the specified key is pressed on the control unit. The data call initiate command (10) directs the signal processing cable to put the cellular phone into proper condition for data transmission, including putting the cellular phone IN USE, setting proper hook condition, establishing proper TX and RX paths, turning off speakerphone, et cetera.

The status information response code (21) is transmitted by the signal processing cable in response to a status information request code (20). The status information response code (21) is followed by a single byte of information, each bit of which represents transceiver status as shown in Table C. A "1" in a bit indicates that the specified condition is in effect. The additional available bits, 4-7, can be assigned to indicate any desired operational condition of the cellular telephone which can be determined by analysis of a signal transmitted over the cellular bus 112.

TABLE C

| STATUS INFORMATION RESPONSE BYTE | |
|---|---|
| BIT | CONDITION |
| 0 | IN USE |
| 1 | NO SERVICE |
| 2 | LOCK |
| 3 | ROAM |
| 4-7 | reserved for future use |

The display information request command (22) requests transmission by the signal processing cable of the contents of the cellular control unit display. The signal processing cable responds to the display information request command with a display information response code (23), followed by a 32-byte ASCII representation of the current characters displayed on the control unit screen. Leading display elements are filled with null characters (ASCII 0).

The debug request command (24) is used during development and testing to transmit data directly to the cellular telephone bus 112. The modem 102 transmits the debug request command to the signal processing cable 100, followed by a single byte representing the number of bytes to be transmitted to the cellular bus 112. The bytes to be transmitted to the cellular bus 112 are then sent. The signal processing cable 100 passes these data bytes directly to the cellular bus 112 without translation of the base data. However, the signal processing cable 100 will provide the data to cellular bus 112 with byte formatting and protocols appropriate to the cellular bus 112. The debug request command (24) could also be used to transmit signals specific to the cellular telephone being used under control of the computer 104 or of the modem user. In this way, non-generic command signals could be generated by the signal processing cable 100. A similar command could also be provided to permit modem 102 to receive non-generic responses from cellular bus 112.

When the cellular telephone 106 rings, an alert sequence is generated by the signal processing cable 100. This alert sequence begins with a 25 Hertz square wave transmitted on SCOUT. The square wave follows the cadence of the cellular telephone ringing tone, typically one second on followed by two seconds off. An alert information code (55) is then generated by the signal processing cable 100, between 200 and 300 milliseconds after each square wave transmission. Preferably, the alert information code is generated 250 milliseconds after an alert sequence. For example, if the cellular telephone 106 rings twice, two cadences of 25 Hz waves and two alert information codes (55) will be generated. The alert sequence signal is a particular feature of the present invention. This signal has similar frequency and timing characteristics to the ringing signal commonly generated on landline telephones. Many currently manufactured modems are designed to recognize as ringing signals incoming signals which have frequencies of 20-60 Hz. and which are repeated periodically. Therefore, provision of a signal by signal processing cable 100 which corresponds to this requirement is a valuable feature, because the ringing detection circuitry of currently popular cellular modems will not require redesign to be compatible with the signal processing cable standard.

The SCACK signal and the MACK signal are not used in communication of the alert sequence. In fact, signal processing cable 100 will be programmed to ignore all information presented to SCIN from the time transmission of the square wave begins until 10 milliseconds after the "55" alert information code is transmitted.

The modem 102 uses this alert information code to determine whether it is a cellular telephone or a landline that is ringing. The absence of an alert information code from the signal processing cable 100 will indicate to the modem 102 that a landline call is coming in.

The wakeup sequence interaction of the signal processing cable 100 and the modem 102 will now be described in detail. This sequence occurs when the signal processing cable 100 is plugged into the RJ-11 jack 140 of modem 102. The signal processing cable 100 and the modem 102 detect this connection by monitoring the SCIN and SCOUT lines. The CPU 122 of signal processing cable 100 and the CPU/modem section 114 of modem 102 are provided with bidirectional input/output ports for the SCIN and SCOUT lines. When the signal processing cable 100 and the modem 102 are turned on, these input/output ports are initialized as input ports. The signal processing cable 100 provides a pullup for the SCIN line, and the modem 102 provides a pullup for the SCOUT line, but the signal processing cable 100 does not have a pull up for the SCOUT line and the modem 102 does not have a pull up for the SCIN line. Thus, when the signal processing cable 100 is connected to the modem 102, the SCIN line port of modem 102 is pulled up by signal processing cable 100 to produce a digital "0" signal at the SCIN line port of modem 102. This digital signal can be read by the CPU/modem section 114 of modem 102, informing the modem 102 that the signal processing cable 100 has been connected to modem 102. Similarly, the SCOUT line port of the signal processing cable 100 will be pulled up upon connection by the modem 102. The processors of modem 102 and signal processing cable 100 may poll the SCIN and SCOUT lines respectively to determine when attachment has occurred, or the changed signals upon attachment could be used to generate an interrupt signal to CPU 122 or CPU/modem section 114 respectively. Thus, the unique design of the pullups for the SCIN and SCOUT lines, when combined with the software described herein, allows detection of the connection of the signal processing cable 100 to the modem 102. While the pullup arrangement described is the preferred means of providing connection sensing, it would also be possible within the scope of the present invention to use other methods, such as for example switches responding to the physical insertion of a connector, or "wire loop" connections from one terminal on a plug to another terminal, operable to connect two or more terminals of the receiving jack when the plug is inserted.

The wakeup sequence is preferably also programmed to execute if the signal processing cable 100 determines that the modem no longer recognizes the connection of signal processing cable 100 to modem 102. The signal processing cable 100 might make this determination, for example, if a ring signal from the signal processing cable 100 is not answered by the modem 102 or if the modem 102 replies to a signal of signal processing cable 100 with an incorrect protocol. There are a number of reasons why the modem 102 might cease to recognize the connection of the signal processing cable 100. As an example, the user of the modem 102 might have turned the modem off and turned it back on.

In the preferred embodiment, the signal processing cable 100 will initiate the wakeup sequence upon detecting the connection of signal processing cable 100 to the modem 102. When the signal processing cable 100 determines that a wakeup sequence should be transmitted, the signal processing cable 100 will transmit digital signals on the SCOUT line at its maximum available speed, generally either 4800, 2400, 1200, or 300 bits per second. The initial signal transmitted by signal processing cable 100 will be 16 bits of alternating "1"s and "0"s, starting with a "1" (ground). The modem 102 will be programmed to respond to the wakeup sequence transmission from the signal processing cable 100. The modem 102 will wait eight bit periods following receipt of the 16th bit of the initial wakeup signal from signal processing cable 100. Modem 102 will then transmit the same initial signal to signal processing cable 100 on the SCIN line. Within eight bit periods after receiving the 16th bit of the signal from modem 102, the signal processing cable 100 will, transmit a SCACK signal on the SCOUT line according to the protocols in Table B. Within eight bit periods after receiving the SCACK signal, the modem 102 will transmit a MACK signal on the SCIN line according to the protocols shown in Table B.

If the wakeup sequence is not completed correctly, the signal processing cable 100 will be programmed to reinitiate the wakeup sequence until the sequence is completed correctly or until the sequence has failed a specified number of times. For example, if the sequence fails four consecutive times, the signal processing cable 100 might be programmed to attempt no further wakeup sequences. The signal processing cable 100 might also be programmed to signal an error, by displaying a message on the screen of cellular control unit 108, activating a light emitting diode, etc. If the wakeup sequence fails at any time, the modem 102 will enter a wait state and do nothing until the signal processing cable 100 reinitiates the wakeup sequence. Alternatively, the modem 102 may assume that a landline-compatible connection has been provided and proceed in an operational mode appropriate to a landline environment. If an attempted wakeup sequence has failed in this manner and the modem 102 has reverted to a landline operational mode, the modem 102 will preferably provide a signal to the computer 104 or the user indicating that the wakeup sequence failed.

Figure 7A:
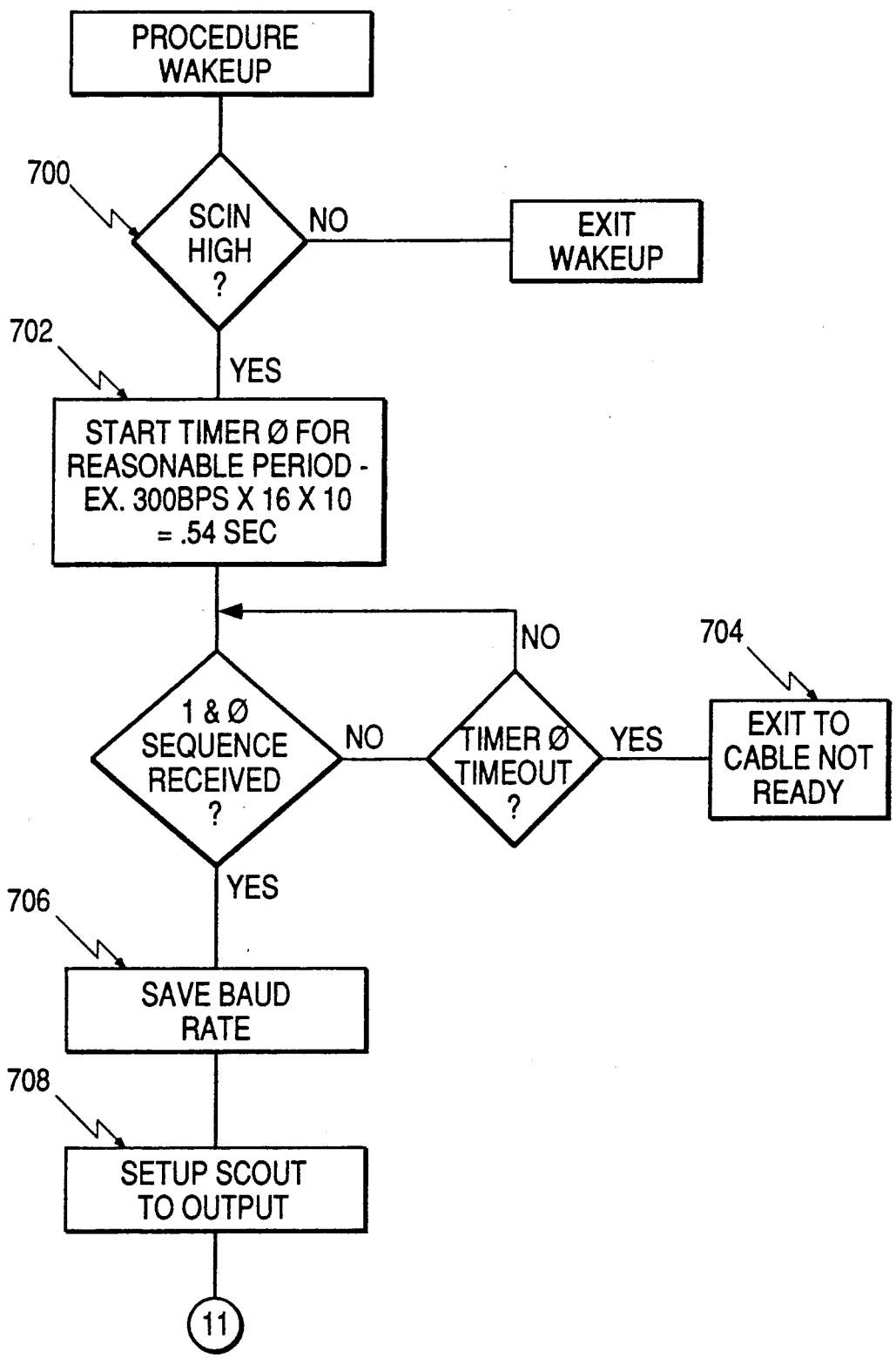
FIGS. 7a and 7b together constitute a flowchart for the wakeup procedure of the modem of the present invention.
Figure 7B:
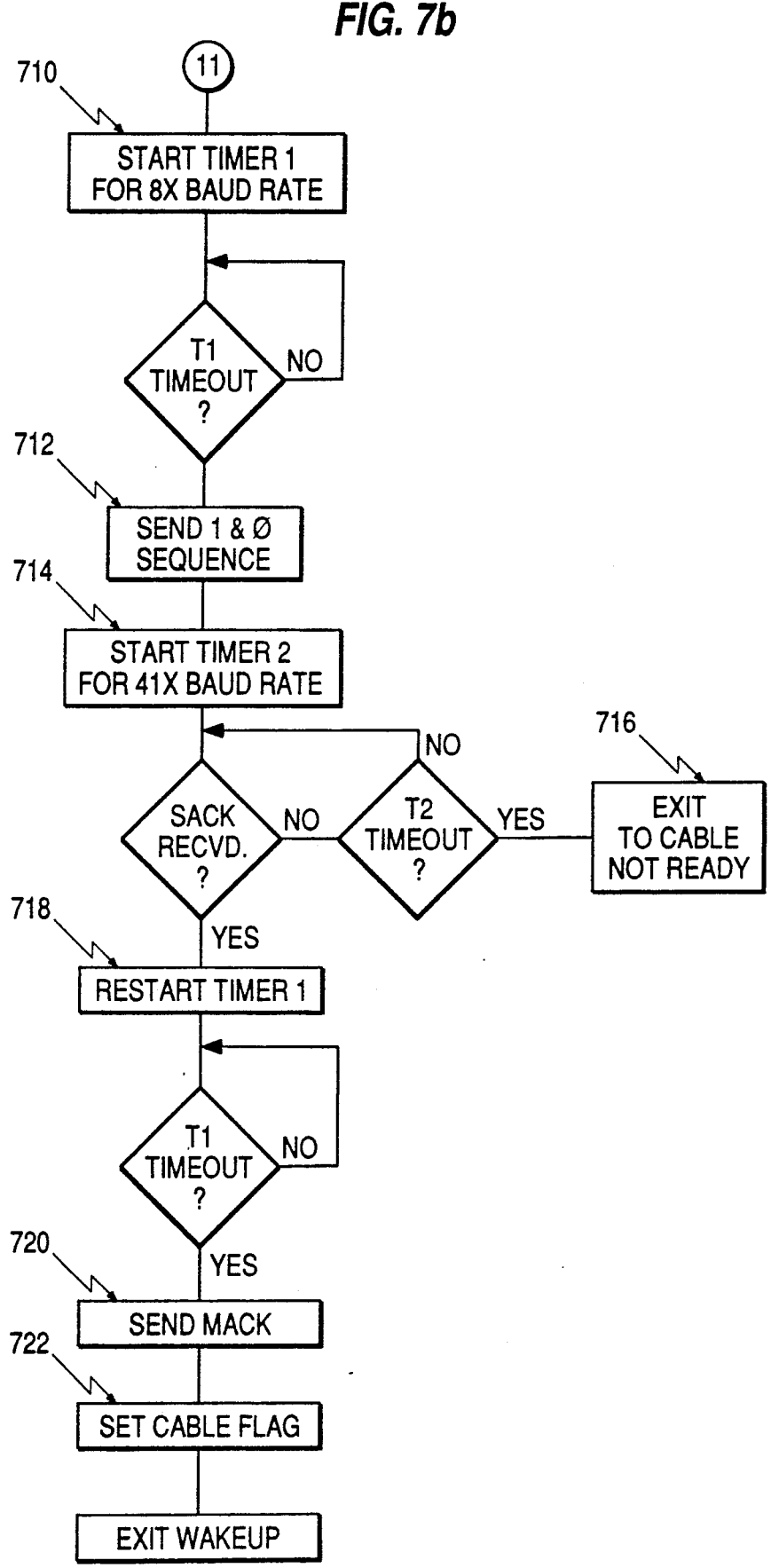

FIGS. 7a and 7b together constitute a flowchart for the wakeup procedure of modem 102. The wakeup procedure does not operate until the SCIN line input to modem 102 goes high as shown in block 700. Thereafter, a timer TIMER0 is started as shown in block 702, which may be a 0.54 second timer if 300 baud communications are used. If the alternating 1 and 0 sequence is not received before timeout of TIMER0, the cable is not ready and block 704 operates to transfer control to the exit-cable not ready procedure of FIG. 9. If the alternating 1 and 0 sequence is received correctly, the modem 102 will determine the baud rate of the transmission and save an indication of the baud rate in memory for future reference as indicated in block 706. The SCOUT line is then set up for output in block 708. A timer TIMER1 is begun in block 710, with the timer TIMER1 being set for the length of time required to transmit eight bits at the baud rate noted in block 706. After the timer TIMER1 times out, a reply sequence is transmitted as shown in block 712. A timer TIMER2 is then activated as shown in block 714 for the period of time required to send 41 data bits at the baud rate noted in block 706. If a SCACK signal is not received from the signal processing cable 100 within the period of TIMER2, control is transferred to block 716 which causes the exit-cable not ready procedure of FIG. 9 to be executed. The TIMER1 timer is then restarted to produce a delay equivalent to eight bit transmission time periods. After the TIMER1 timer times out, the modem 102 sends a MACK signal as shown in block 720 and sets a "cable" flag in the memory of modem 102 indicating that communications have been established with the signal processing cable 100, as shown in block 722.

Figure 9:
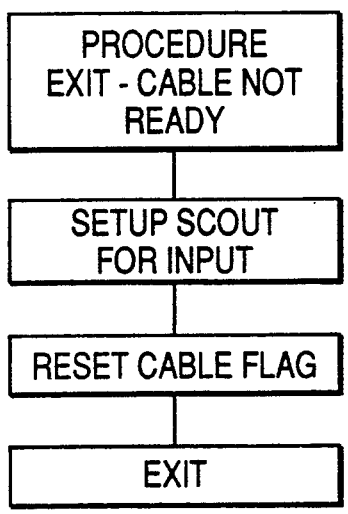
FIG. 9 is a flowchart for the exit-cable not ready procedure of the modem of the present invention.

FIG. 9 is a flowchart showing a preferred embodiment of the exit-cable not ready procedure of modem 102. The exit-cable not ready procedure provides that the SCOUT line should be set up as an input and the "cable" flag should be reset to indicate that communications have not been established with signal processing cable 100. Thus, when the procedure of FIG. 9 has been executed, the modem 102 will be placed in a mode wherein connection of the signal processing cable 100 can be attempted again, and wherein the modem 102 will operate under the assumption that only a landline telephone line is connected.

Of course, the wakeup sequence could also be initiated by a transmission from the modem 102 since the modem 102 is also capable of sensing the connection of the signal processing cable 100 to the modem 102. If this mode of operation were desired, the modem 102 would initiate the wakeup sequence upon detection of the connection by transmitting digital signals over the SCIN line at a predetermined speed known to be compatible with the signal processing cable 100, either 4800, 2400, 1200, or 300 bits per second. The initial signal transmitted by modem 102 would be 16 bits of alternating "1"s and "0"s, starting with a "1" (ground). The signal processing cable 100 would be programmed to respond to the wakeup sequence transmission from the modem 102. The signal processing cable 100 would wait eight bit periods following receipt of the 16th bit of the initial wakeup signal from modem 102. Signal processing cable 100 would then transmit the same initial signal to modem 102 on the SCOUT line. Within eight bit periods after receiving the 16th bit of the signal from signal processing cable 102, the modem 102 would then transmit a MACK signal on the SCIN line according to the protocols in Table B. Within eight bit periods after receiving the MACK signal, the signal processing cable 100 would transmit a SCACK signal on the SCOUT line according to the protocols shown in Table B to complete the wakeup sequence.

While the modem 102 has been shown in FIGS. 1, 2a and 2b as being separate from the computer, it is also possible to design a modem 102 according to the present invention that is installed internally to the computer. Such an internal modem has particular utility when used with a portable computer, such as, for example, a Zenith Supersport. When equipped internally with the modem 102 of the present invention, the Zenith Supersport computer can be plugged into a landline telephone jack to transmit over landlines. The Zenith computer with the modem 102 can also be plugged into a cellular telephone 106 by means of an appropriate signal processing cable 100 for cellular data transfer. A modem 102 designed for internal installation in a Zenith Supersport computer is shown in FIGS. 3a through 3e and 4.

The diagrams of FIGS. 3a through 3e and 4 constitute a single circuit in which labeled lines are connected to other lines bearing the same labels, although these connections have been omitted in some cases for clarity. Where connections have been omitted, a diamond-shaped device indicates a connection to another line or lines in the same FIGS. (3a through 3e or 4), while a pennant-shaped device indicates a connection to a line or lines in the other of the FIGS. 3 and 4. The connections within FIGS. 3a through 3e are indicated by the legends in these Figures.

Figure 3A:
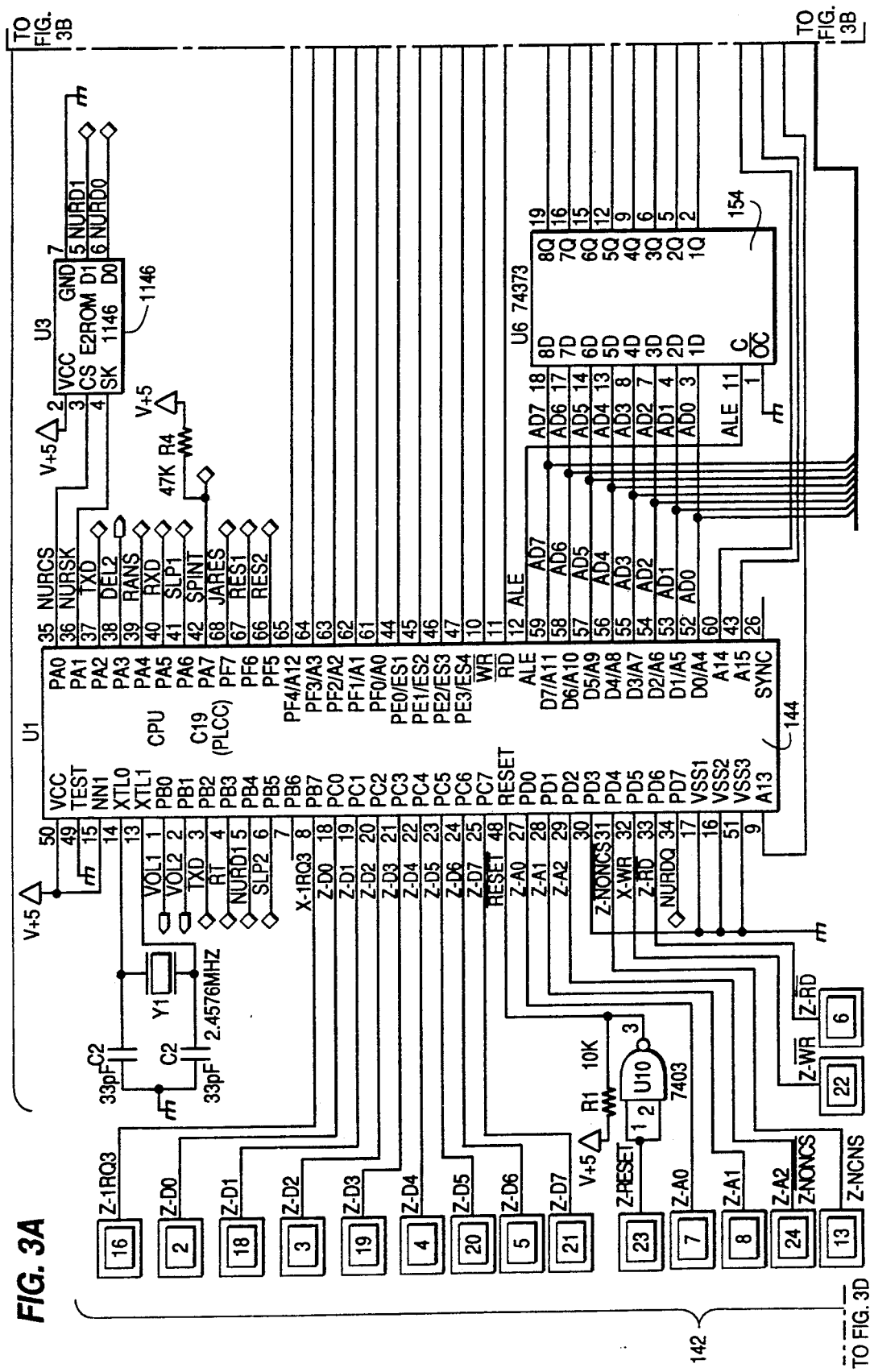
FIGS. 3a through 3e together form a schematic diagram of a preferred embodiment of the modem section of the cellular data modem of the present invention designed for installation in a portable computer.

In FIGS. 3a through 3e, a schematic diagram of the CPU/modem section 114 of a modem 102 designed for internal installation in a Zenith Supersport computer is shown. The CPU/modem section 114 (and the DAA section 118 shown in FIG. 4) are preferably constructed on a circuit board designed to fit into the modem card slot of the Zenith Supersport computer. Referring now to FIG. 3a, the CPU/modem section 114 is provided with appropriate edge connections 142 for connecting to the Zenith Supersport modem connector. The functions of the lines and pins of the Zenith modem bus are as described in Service Manual Portable Computer ZWL 200-2/4 Zenith Part No. 585-295 and Technical Specifications for Internal 2400 Baud Modem Part No. 150-418, which are available from Zenith, Inc. and which are incorporated herein by reference.

The CPU/modem section 114 includes CPU 144, EEROM 146, RAM 148, ROM 150, power supply section 151, modem chip 152, and demultiplexer 154. Table D shows sample model numbers and manufacturers for the integrated circuit components. The CPU/modem section 114 also includes numerous interfacing components including capacitors, resistors, transistors, and logic gates which are connected as shown in FIGS. 3a through 3e.

TABLE D

| COMPONENT MODELS AND MANUFACTURERS | | |
| --- | --- | --- |
| Reference # | Model | Manufacturer |
| 144 | C19 PLCC | Rockwell |
| 146 | 9346 | National Semiconductor |
| 148 | 55257 | Toshiba |
| 150 | 27512 | Toshiba |
| 152 | R6634 | Rockwell |
| 154 | 74373 | Motorola |
| 158, 159 | TL072 | Texas Instruments |
| 160, 161 | TL072 | Texas Instruments |
| 162 | V250LA2 | General Electric |
| 164 | LH1056E | AT&T |
| 166 | TTC-143 | Timura |
| 168 | 7403 | Motorola |

Figure 3B:
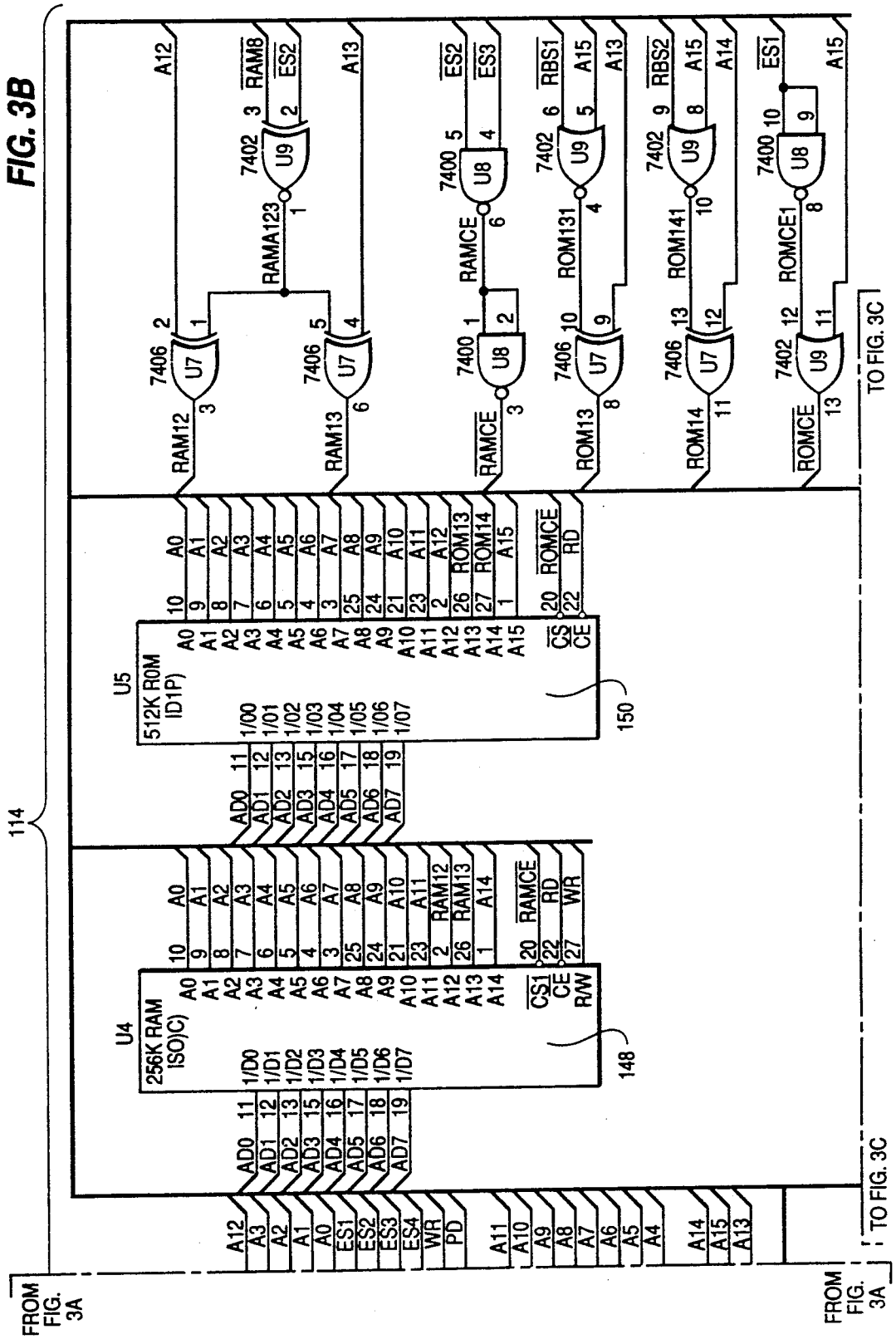

The CPU 144 controls the operation of modem 102 according to the program stored in the ROM 150 (shown in FIG. 3b). The operation of certain program procedures stored in ROM 150 will preferably be according to the flowcharts shown in FIGS. 6, 7a, 7b, 8, 9, and 10. The CPU 144 will receive data to be transmitted from the Zenith computer, and instruct the modem chip 152 (shown in FIG. 3c) to modulate and transmit the data. The CPU will also accept data received and demodulated by the modem chip 152, transmitting this data to the Zenith computer. The software program stored in ROM 150 will preferably also implement a cellular-compatible protocol including forward error correction, variable packet sizing, and compensation for loss of carrier during cell handoffs. Such a protocol is described in the inventor's prior U.S. Pat. No. 4,697,281, the disclosure of which is incorporated herein by reference. It will also be desirable for the software program stored in ROM 150 to select different protocols depending on the conditions encountered. For example, the software may select a cellular-compatible protocol when the signal processing cable 100 is connected to the modem 102, and may select a second, more general landline compatible protocol when the modem 102 is connected to a landline telephone jack. As will be seen, the modem 102 can detect the presence of signal processing cable 100 by sensing the pullup of the SCIN line within signal processing cable 100.

The software program in ROM 150 will further cause the CPU 144 to transmit commands to the signal processing cable 100 and receive data and acknowledgement signals from the signal processing cable 100, according to the command language protocols described herein, to set up and monitor cellular calls whenever cellular data communication is requested by the Zenith Supersport computer.

Figure 6:
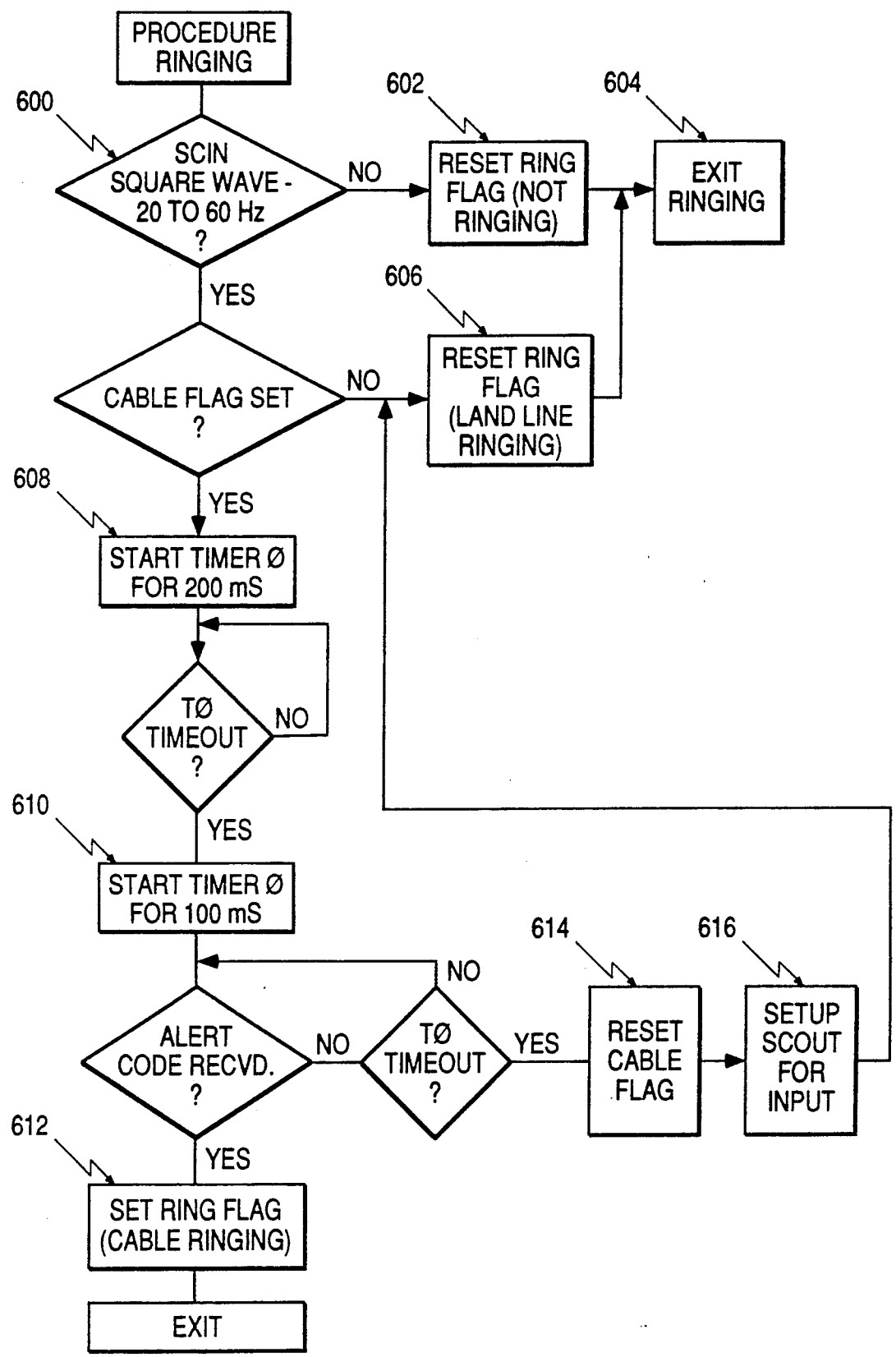
FIG. 6 is a flowchart for the ringing response procedure of the modem of the present invention.

Referring now to FIG. 6, a flowchart for a preferred software embodiment of a ringing response procedure of modem 102 is shown. When the ringing procedure becomes active, the modem 102 will monitor the SCIN line to determine whether a ringing signal is present as shown in block 600. If not, a "ring" flag which indicates that a line is ringing will be reset in block 602 and the ringing procedure will be exited in block 604. If the ringing signal is present and the "cable" flag of the memory of modem 102 is not set, indicating that a signal processing cable 100 is not connected, the "ring" flag will be set as shown in block 606 to indicate that the landline connection is ringing, and control will be returned to the standard program of modem 102 which will operate to answer the landline call. If the "cable" flag is set when a ringing signal is present, the cellular line is ringing, and control is transferred to block 608. In block 608, a timer TIMER0 of 200 ms duration is started. After the timer TIMER0 times out, the timer TIMER0 is restarted for a 100 millisecond period. If an alert code is received from the signal processing cable 100 during the period of timer TIMER0, the "ring" flag will be set to indicate that the cellular line is ringing as shown in block 612 and control will be returned to the main modem program which will answer the cellular call to provide cellular data communications. If the timer TIMER0 times out without an alert code being received by modem 102, the "cable" flag will be reset to indicate that a problem exists with the communications link between signal processing cable 100 and modem 102, as shown in block 614. The SCOUT line will be set up for input, as shown in block 616, control will be transferred to block 606, and operation will continue as though a landline call had been received.

Figure 8:
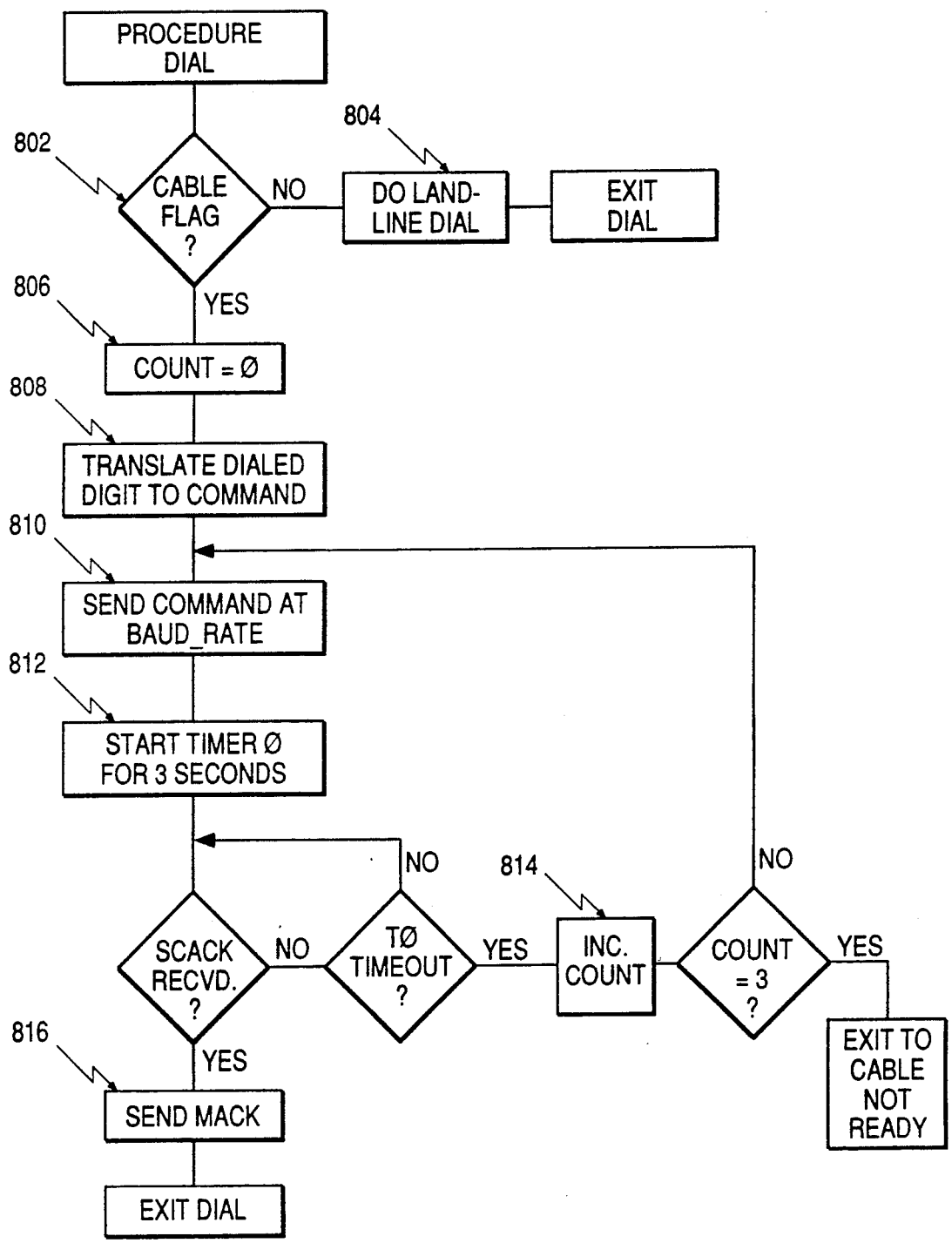
FIG. 8 is a flowchart for the dial procedure of the modem of the present invention.

FIG. 8 shows the dial procedure of modem 102. In block 802, the "cable" flag is checked to determine whether a landline or cellular line is connected. If the "cable " flag is not set, the modem 102 will commence a landline dialing sequence as shown in block 804. If the "cable" flag is set, the modem 102 will place a call using a cellular network. The COUNT variable is set to 0 in block 806. The dial procedure then translates the telephone number to be dialed (as supplied by the user or the computer connected to the modem) into a generic language command according to the command language shown in Table B, as shown in block 808. This command is transmitted to signal processing cable 100 at the appropriate baud rate stored in the memory of modem 102 as shown in block 810. A timer TIMER0 is then started for a period of three seconds as shown in block 812. If the SCACK signal has not been received by modem 102 before TIMER0 times out, the COUNT variable is incremented as shown in block 814. If the COUNT variable has reached the value of three, the modem 102 determines that communications between modem 102 and signal processing cable 100 are not functioning properly and control is transferred to the exit-cable not ready procedure as shown in FIG. 9. As long as the COUNT variable has not reached three, control will be passed back to block 810 for retransmission of the generic command. When the command has been transmitted successfully and SCACK has been received, the MACK command will be transmitted by modem 102 as shown in block 816.

Figure 10:
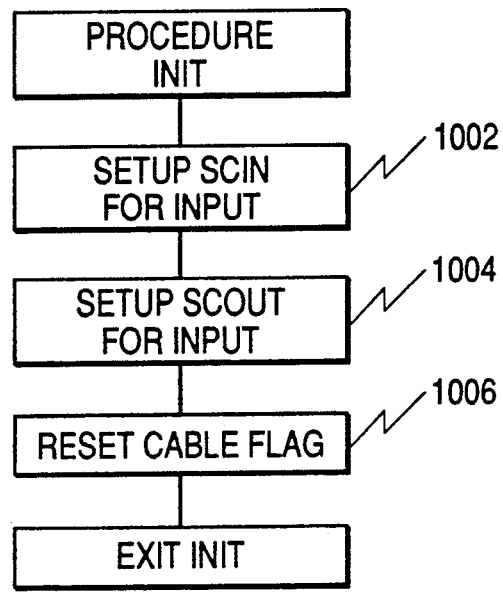
FIG. 10 is a flowchart for the initialization procedure of the modem of the present invention.

In FIG. 10, the initialization procedure for modem 102 is shown in flowchart form. This procedure is executed whenever modem 102 is reset, as at powerup, and may be executed in response to a software reset or a reset command from an attached computer. First, the SCIN line is set up for input as shown in block 1002. Next, the SCOUT line is set up for input as shown in block 1004. Next, the "cable" flag is reset to indicate that communications have not been established with signal processing cable 100, as shown in block 1006. Although other functions might be performed at initialization, this completes a preferred initialization procedure.

Figure 3C:
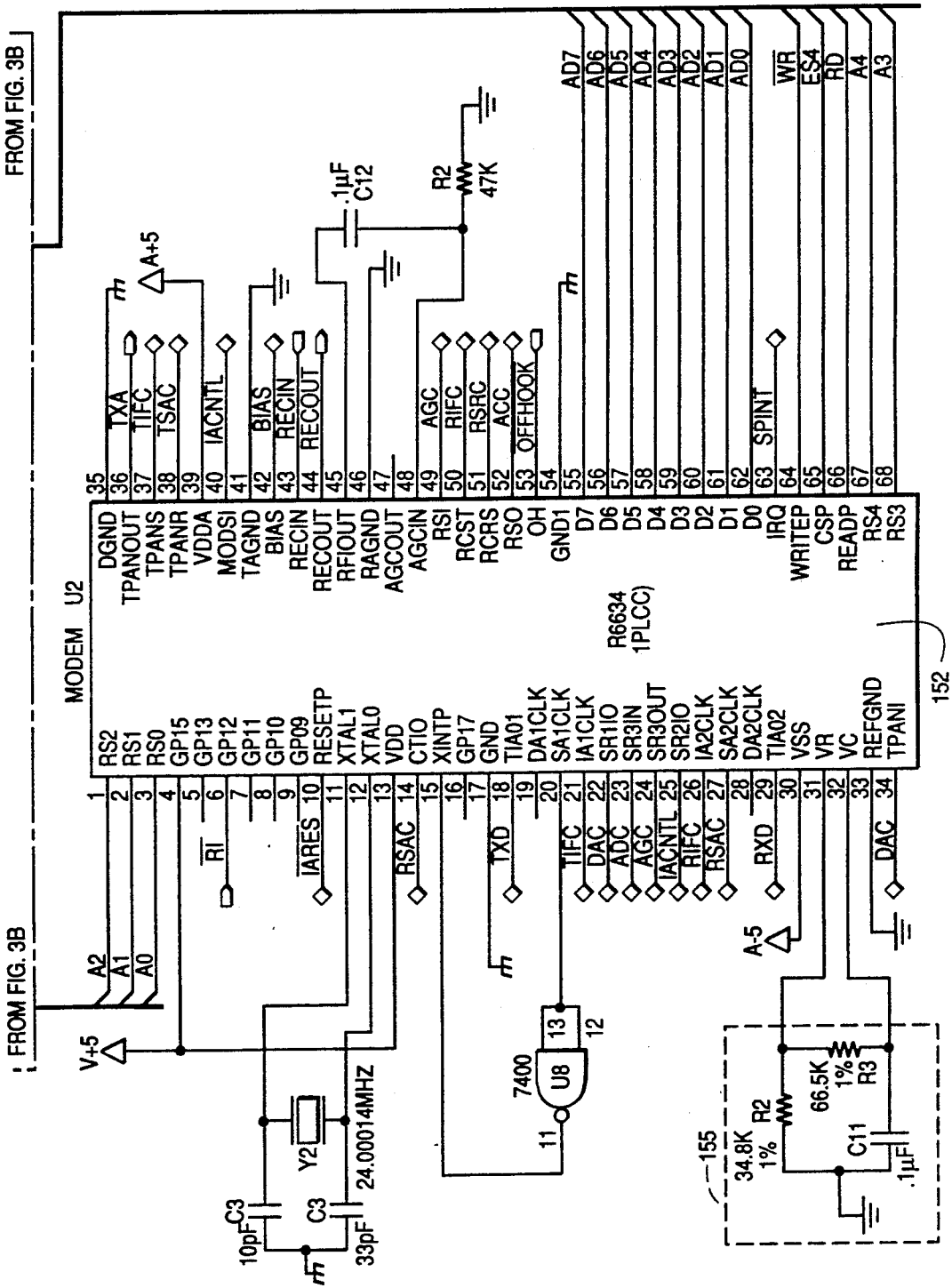
Figure 3E:
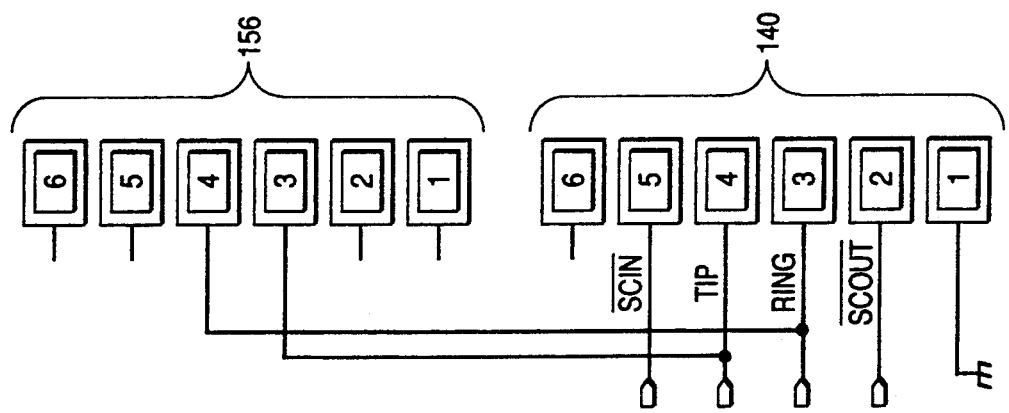

Referring now to FIG. 3e, the RJ-11 connector 140 of modem 102 is shown. The lines of this connector are connected according to the description in Table A. However, since the modem 102 will draw its power from the Zenith Supersport computer rather than from the cellular telephone 106, the BAT line of the RJ-11 connector 140 is not connected within the modem 102. In the embodiment shown in FIGS. 3a through 3e, the modem 102 is provided with a second RJ-11 connector 156. The second RJ-11 connector 156 is connected only to the TIP and RING lines of the modem 102, so that the second RJ-11 connector 156 can be used only with landline telephones. Of course, it is also possible to provide only a signle RJ-11 connector 140 which can be used either with landline telephones or, with the proper signal processing cable, with cellular telephones. If a single connector is used, it would be possible to isolate the SCIN and SCOUT lines of the modem 102 whenever the modem 102 is not being used with a signal processing cable 100. Isolation of the SCIN and SCOUT lines would prevent damage to the modem 102 in case the second and fifth pins of the landline telephone cable are being used to carry landline telephone signals. Any of a number of protective circuits or switching devices, such as a simpoe toggle switch, could be used to limit incoming signal power on the SCIN and SCOUT lines or to disconnect these lines from the components of modem 102 when the modem 102 is used with a landline connection.

Figure 3D:
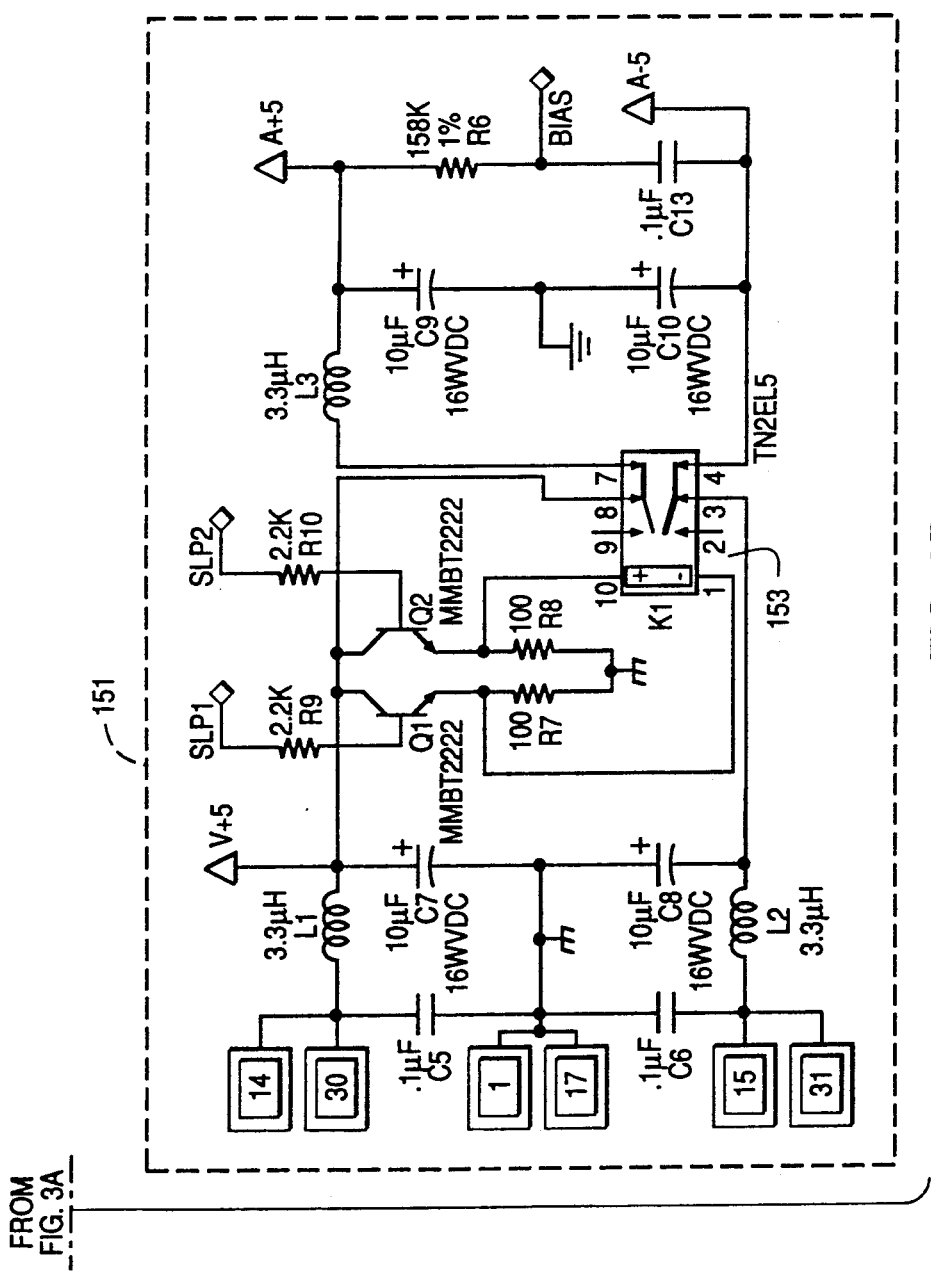

The power supply section 151 shown in FIG. 3d operates to control power to the CPU/modem section 114 and the DAA section 118. The SLP1 and SLP2 signals are generated by microprocessor 144 and are selected asserted by microprocessor 144, causing the relay 153 to enable and disable power to sections of the circuits of modem 102.

Referring to FIG. 3c, the modem chip 152 is a combination digital signal processor and analog front end (A/D and D/A converter). The modem chip 152 is provided with its own 24.000014 Mhz frequency crystal to enable timing functions for digital signal processing. The modem chip 152 is also provided with a bias section 155 which provides a bias voltage used in the analog front end functions of modem chip 152.

The OR, AND, and NOR gates labeled U7, U8, and U9 respectively and shown in FIGS. 3b and 3c are used in address decoding and memory bank swapping. Since the CPU 144 can directly address only 64K of memory, and substantial excess memory is ued in the system, a memory bank swapping scheme is necessary for proper system operation.

Figure 4:
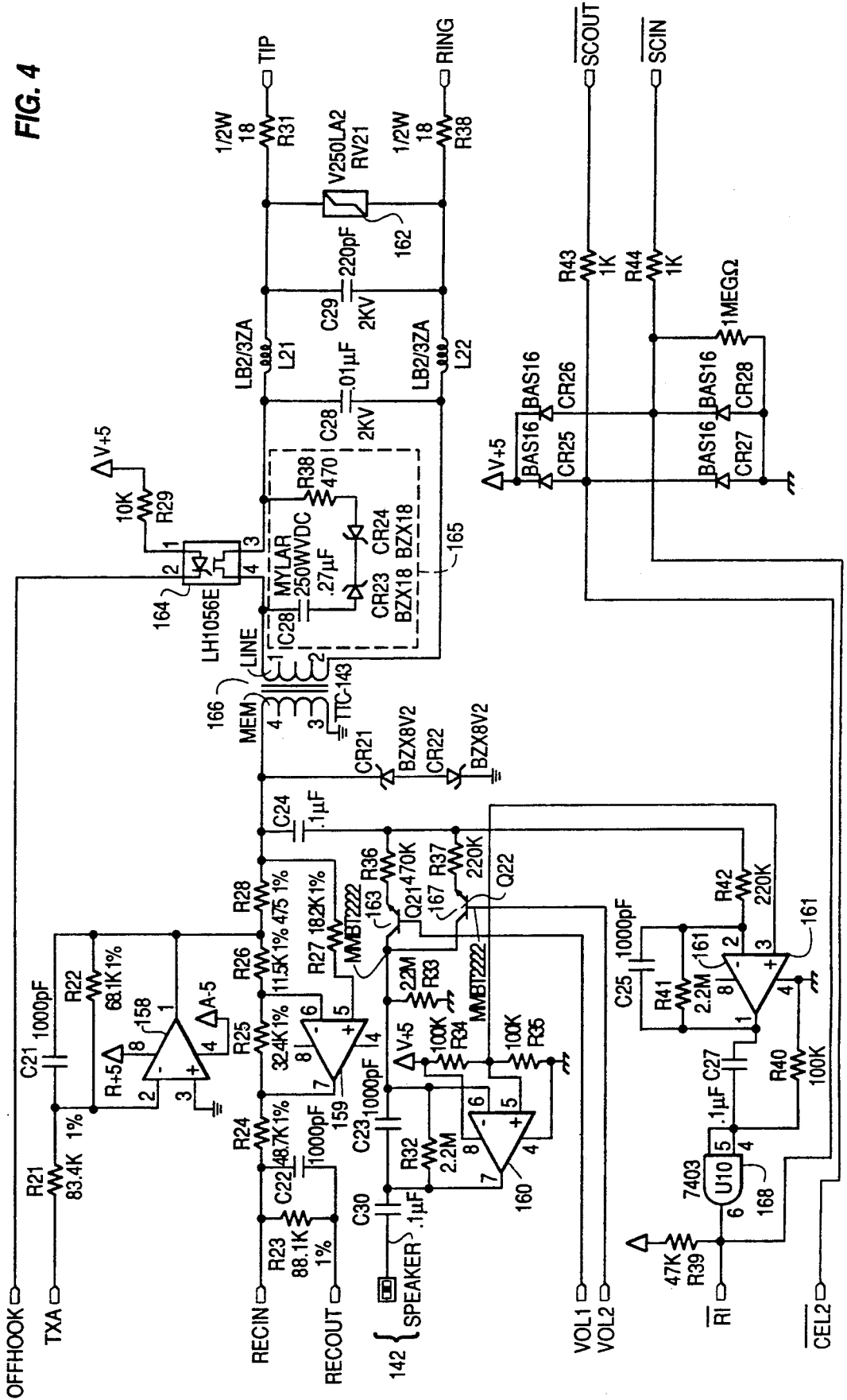
FIG. 4 is a schematic diagram of a preferred embodiment of the Data Access Arrangement section of the cellular data modem of the present invention.

Referring now to FIG. 4, the DAA section 118 of the modem 102 is shown in detail. DAA section 118 includes operational amplifiers 158, 159, 160, and 161, varistor 162, isolated FET switch 164, bypass network 165, isolation transformer 166, NAND gate 168, and resistance switching transistors 163 and 167. Exemplary model numbers and manufactures for major components are shown in Table D. In addition, DAA section 118 includes numerous rsistors, capacitors, and diodes with values as indicated in FIG. 4. The transistors shown in FIGS. 3d and 4 may be 2N2222 transistors manufactured by motorola.

The DAA section 118 provides isolation and interfacing circuitry for connecting the CPU/modem section 114 to the analog TIP and RING lines. In addition, the DAA section 118 provides appropriate pullup, pulldown, and protective circuitry for the SCIN and SCOUT lines. The SCOUT and SCIN terminals of the modem 102 are open collector. A logic "1" is represented by ground, and a "0" is represented by Vcc, which is 5 volts DC. The DAA section 118 provides a pullup for the SCOUT terminal to hold it at a logic "0" unless it is driven by the signal processing cable 100. As will be seen, the signal processing cable 100 includes a 47 kOhm pullup resistor connected between its SCIN terminal and Vcc to hold the SCIN terminal at a logic "0" unless the line is driven by the modem 102.

The isolation transformer 166 provides FCC part 68 protection for the circuit. The isolated FET switch 164 responds to the OFFHOOK signal to take the modem 102 on and off hook. The by pass network 165 provides snubbing and allows ring voltage to be transmitted at an attenuated level to the CPU/modem section 114 even when the isolated FET switch 164 is open (on hook).

The operational amplifiers 158 and 159 are preferably contained in a single monolithic device. Similarly, the operational amplifiers 160 and 161 may be contained in a single device. Operational amplifier 161, with its associated circuitry, senses ring voltage from the tip and ring lines and selectively produces a ring indication signal RI. Operational amplifier 158 is a transmission signal amplifier. The capacitor C21 and resistor R22 associated with operational amplifier 158 provides high frequency filtering of the transmission signal. The operational amplifier 159 is an input signal amplifier stage and summer. Operational amplifier 159 acts to separate the output signal from the total TIP and RING signals so that the input signal can be passed to CPU/modem section 114.

The operational amplifier 160 acts as a volume controlled speaker amplifier. The resistance switching transistors 163 and 167 respond to the VOL1 and VOL2 signals generated by CPU/modem section 114 to connect either a 470K ohm resistor, a 200K ohm resistor, oor both these resistors in parallel between the speaker signal and the speaker. Thus, four possible volume levels corresponding to the digital level permutations of VOL1 and VOL2 are possible.

While the schematic diagrams of FIGS. 3a through 3e and 4 show a system designed to interface with a Zenith Supersport computer, those skilled in the art will recognize that the modem 102 of the present invention could be readily adapted for installation in other types and brands of portable computers and other computing devices in general.

Figure 5:
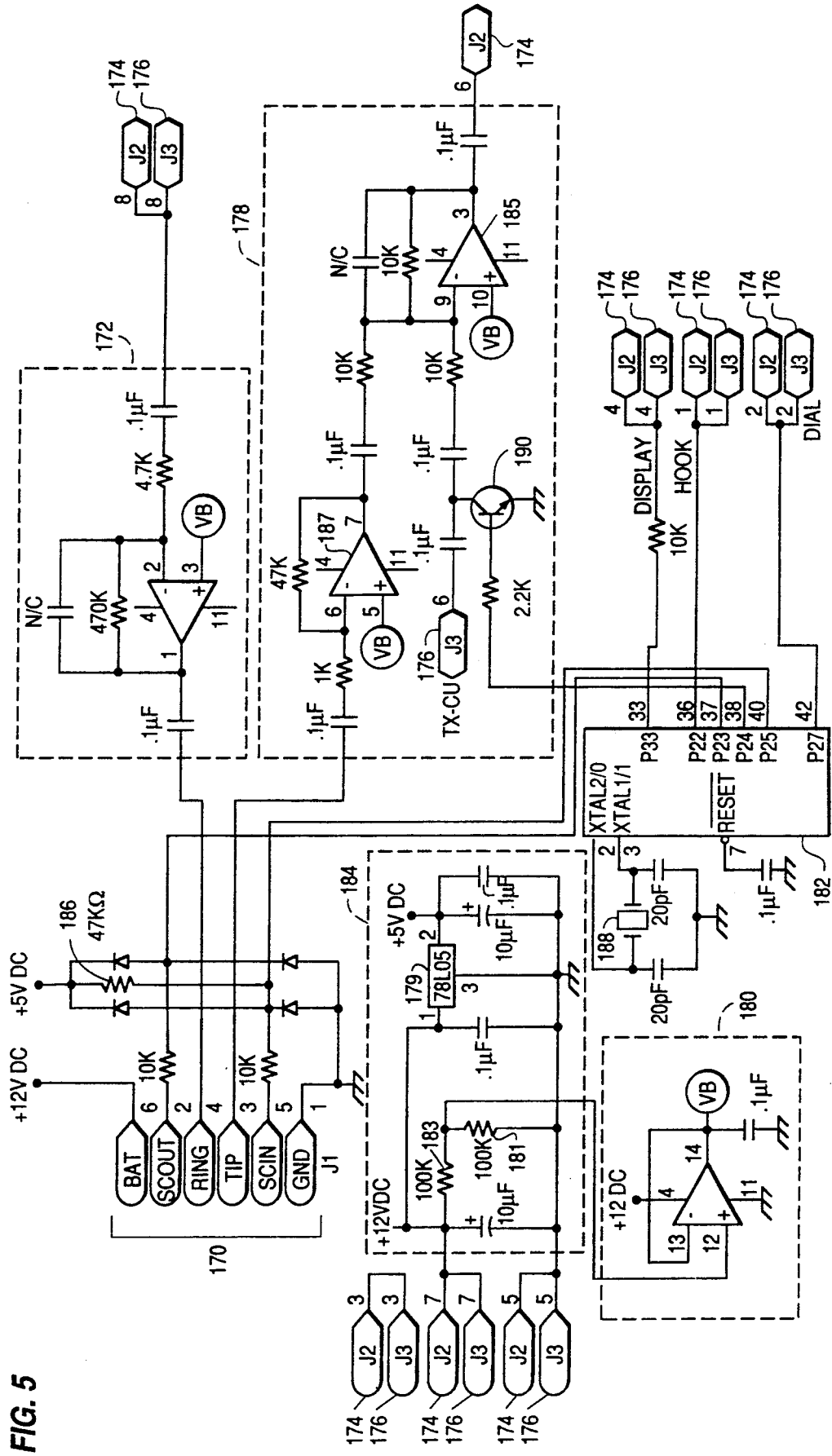
FIG. 5 is a schematic diagram of a signal processing cable according to the present invention.

A preferred embodiment of the signal processing cable 100 is shown in FIG. 5. The signal processing cable shown in FIG. 5 is designed to operate with the modem 102 shown in FIGS. 3 and 4 and with a Fujitsu Commander cellular telephone. Of course, those skilled in the art can readily construct signal processing cables in accordance with the present invention to operate with other brands and models of cellular telephones. It is a particular advantage of the present scheme for connecting computers to cellular and landline telephone networks that the signal processing cables are relatively simple and low in cost. As new cellular telephone models and brands are introduced, the design shown in FIG. 5 or a similar design can be adapted for use with these other telephones through simple wiring, connector, and software modifications. The functions and connections of the cellular bus lines in the Fujitsu Commander telephone are described in the "Fujitsu Commander Cellular Mobile Telephone Installation and Maintenance Manual," available from Fujitsu America, Inc., Richardson, Tex. which is incorporated herein by reference.

Referring now to FIG. 5, the signal processing cable 100 includes an RJ-11 connector 170 (also labeled J1), ring interface section 172, tip interface section 178, cellular bus connectors 174 and 176 (alsoo labeled J2 and J3 respectively), bias voltage section 180, microcontroller 182, and power supply section 184.

The signal processing cable 100 includes numerous resistors and capacitors which have the values shown in the diagram. The capacitors marked N/C (for "No Connect") are optional filtering capacitors. If included in the circuit, these capacitors may take on any desired value appropriate for filtering unwanted signals. The signal processing cable 100 also includes transistor 190, which may be a Motorola 2N2222 transistor. The diodes shown in FIG. 5 may be 1N914 diodes manufactured by Motorola.

The RJ-11 connector 170 is mounted on the end of a modular telephone wire of appropriate length and is adapted to connect to the RJ-11 connector 140 of modem 102 (as shown in FIG. 2a).

The cellular bus connectors 174 and 176 are RJ-45 connectors as manufactured by Amphenol, and are mounted on wires of appropriate length for connection to the cellular transceiver 110 and control unit 108. Rather than connecting to the cellular bus 112 using a threeway connector as shown in FIG. 2a, which would merely connect all the equivalent lines of three cables, this preferred embodiment of the invention provides two cables at the cellular telephone sides of signal processing cable 100. One of these cables, terminating in cellular bus connector 174, is connected to cellular transceiver 110. The other cable, terminating in cellular bus connector 176, is connected to cellular control unit 108. Thus, the cellular bus 112 passes through the signal processing cable 100. This embodiment is preferred because the number of connectins and wires required is reduced and because this arrangement allows the signal processing cable to selectively block signals transmitted on cellular bus 112 by control unit 108 or transceiver 110 as well as injecting signals into the cellular bus 112.

The microcontroller may be a Zilog Z8 PLCC surface mount microcontroller, model Z86C08 which includes a microprocessor, RAM, input/output ports, and a mask-programmed ROM program memory. The program memory of the microcontroller 182 will be masked to contain a program implementing the functions of the signal processing cable 100 which have been described herein. The source code for this program may be as shown in Appendix A. The microcontroller 182 is provided with a crystal 188 which may be a 3.6864 Mhz crystal.

The power supply section 184 includes a 5 V DC power supply regulator 179, which may be a 78L05, and various filter capacitors as shown in the drawing. The voltage divider resistors 181 and 183 are connected between 12 V DC and ground, so that a voltage of approximately 6 V DC is produced at the connection of voltage divider resistor 181 to voltage divider resistor 183.

The four operational amplifiers shown in ring inerinterface section 172, tip interface section 178, and interface section 180 are preferably contained in a monolithic TL074 integrated circuit manufactured by Texas Instruments. Pin numbers for the connections to this circuit are indicated in FIG. 5. The operational amplifiers operate with a bias voltage VB generated by the bias voltage 180 from the 6 V DC voltage provided at the common terminal of the two 100K Ohm voltage divider resistors 181 and 183 of power supply section 184. The connection of pins of the operational amplifier circuit to the circles designated VB (pins 3, 5, 10, and 14) indicates an electrical connection between these pins, although the lines for these connectins have been omitted from FIG. 5 for clarity.

The ring interface section 172 provides level and impedance matching for the RING line to make the RX signal of the Fujitsu cellular transceiver compatible with the RING analog terminal of modem 102. Similarly, the operational amplifier 187 of ring interface section 172 provides impedance and level matching for the TIP line to make the TIP signals of the modem 102 and the TX signal of the Fujitsu cellular transceiver compatible.

Tip interface section 174 further includes a summing operational amplifier 185 which sums the tip signals and the signals produced by the microphone of cellular control unit 108. Tip interface section 174 also includes a switching transistor 190. The base of switching transistor 190 is connected through a resistor to the P25 terminal (pin 40) of the microcontroller 182. By controlling the output of its P25 terminal, the microcontroller 182 can selectively ground the line connected to the collector of the switching transistor 190 to selectively inhibit or permit the transmission of signals from the cellular control unit microphone (which is connected to pin 6 of cellular bus connector 176) to cellular bus connector 174.

The microcontroller 182 is connected by its P22 terminal inlput/output port (pin 36) to the Hook lines of the cellular bus 112. The microcontroller 182 can thus selectively control the voltage on the Hook lines of cellular bus 112. Similarly, the P27 terminal (pin 42) of the micronntroller 182 is connected to the dial lines of the cellular bus 112. The microcontroller 182 can therefore selectively control the voltage on the dial lines of cellular bus 112 by varying the signal from the P27 terminal to the dial lines.

In another embodiment of the signal processing cable 100, the signal processing cable 100 may be designed to operate with more than one type of cellular bus. Multiple-bus compatibility would be particularly desirable where several types of cellular busses use the same connectors and use relatively similar signalling lines within their busses. The masked ROM of the microcontroller 182 provides enought memory capacity to store operating information for several types of cellular busses. Other than the additional oprating software required, all that is required to produce a signal processing cable 100 compatible with a plurality of types of cellular busses is to provide an input signal specifying the type of bus. In the simplest embodiment, this input signal could be one or more DIP switches, jumper lines, or switches mounted on the exterior of the circuit casing of signal processing cable 100 and connected to an input of microcontroller 182. These switches or jumpers would be adjusted by the end user to define the type of cellular bus 112 connected to signal processing cable 100, and the program of microcontroller 182 would respond to these switch or jumper signals to select appropriate protocols or appropriate transmisison lines of the cellular bus 112 to be used. In another embodiment of the multiple-bus compatible signal processing cable, input ports of the microcontroller 182 may be connected to lines of the cellular bus 112 and the microcontroller 182 is programmed to sense signals on the lines of the celluar bus 112 to identify the configuration of the cellular bus 112. The program of microcontroller 182 would then select appropriate protocols and lines transmission of signals to and reception of signals from the particular type of cellular bus 112.

While the multiple-bus embodiment of the signal interface cable 100 has been described in terms of cellular busses that use similar connectors, it would also be possible to design such a multiple-bus cable to be compatible with a plurality of busses using dissimilar connectors. In this embodiment, the signal processing cable 100 would be provided with a plurality of cables for connecting to the celluar bus 112 or for connecting to the cellular control unit 108 and the cellular transceiver 110, and the user would select the cables to be connected or would select from amont plug adapters provided for adaptation of the cables to dissimilar connection systems.

The SCIN line, pin 2 of the RJ-11 connector 170, is connected to +5 volts DC by pullup resistor 186, whichis a 47 kOhm resistor.

The command codes and responses will be transmitted between the modem 102 and signal processing cable 100 over SCIN and SCOUT, as approprite, at a speed of 4800, 2400, 1200, or 300 bits per second. The speed of transmission will be determined by the maximum speed capability of the signal processing cable 100, which will be communicated to the modem 102 during the waekup sequence, which was explained in detail previously. The signal processing cable 100 is preferably designed to have the lowest cost components and lowest power consumption consistent with its mission of communicating with the cellular telephone bus 112. Thus, although the signal processing cable 100 could be designed to operate at much higher speeds, in the intersts of reducing cost and power consumption, speeds of 4800 baud or less are peferred.

In general, additional forms of signal limiting protection, as are well-known in the art, may be includes in the system to minimize the possibility of damage to the circuits of the present invention by transmission of high voltage or current signals through the various information transfer line connections. To the extent possible, in order to minimize the cost of the signal processing cable 100, any additional desired signal limiting protection for information transfer terminals will preferably be provided within modem 102 rather than in signal processing cable 100.

Each byte of data is preferably sent as eight bits, with one start bit (logic "1" or ground) and two stop bits, for a total of 11 bits per word sent. As a pareticular feature of the invention, each byte sent will be repeated three times, allowing for majority decoding. The bits are repeated without the insertion of additional stop bits, so that one byte of data can be sent as 33 bits presented serially in 33 bit times.

Exceptions to this method of data transmission on the SCIN and SCOUT lines occur during the wakeup sequence and the alert sequence, as described previously.

STATEMENT OF INDUSTRIAL APPLICABILITY

Broadly, the present invention relates to the field of digital data transmission systems. More specifically, the present invention is an integrated modem and interfacing system that permits connection of a single cellular-capable modem to a variety of cellular transceivers or to a landline telephone jack.

I claim:

1. A system for connecting a computer device for data transmission over a telephone network which can be accessed through a telephone network access device responsive to device-specific command signals to perform a network accessing function, comprising:
   a. control means for controllng the transmission of computer data between the computer device and the telephone network and for generating a generic command signal representative of a desired telephone network access device newtwork accessing function and transmitting the generic command signal over a command signal bus;
   b. modem means connectable to the computer device and connected to the control means for processing the computer data signals transmitted between the computer device and the telephone network; and
   c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network;
   wherein the generic command signals generated by the control means are transmitted to the interface means using digital transmission means, therein the data transmitted between the modem means and the telephone network is carried on transmission lines separate from the digital transmission means carrying generic commands signals between the control means and the interface means, and wherein the interface means transmits an alert sequence signal to the control means using the digital transmission means in response to signals from the telephone network access device indicative of an incoming call.

2. A system for connecting a computer device for data transmission over a telephone network which can be accessed through a telephone network access device responsive to device-specific command signals to perform a network accessing function, comprising:

a. control means for controlling the transmission of computer data between the computer device and the telephone network and for generating a generic command signal representative of a desired telephone network access device network accessing function and tansmitting the generic command signal over a command signal bus;

b. modem means connectable to the computer device and connected to the control means for processing the computer data signals transmitted between the computer device and the telephone network; and c. interface means selectively connectable between the modem means and control means and the telephone network access device for generating and tansmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network;

wherein the system is adapted for selective use with either a cellular telephone network or a landline telephone network.

3. A system for connecting a computer device for data transmissions over a telephone network which can be accessed through a telephone network access device responsibe to device-specific command signals to perform a network accessing function, comprising:

a. control means for controlling the transmission of computer data between the computer device and the telephone network and for generating a generic command signal representative of a desired telephone network access device network accessing function and transmitting the generic command signal over a command signal bus;

b. modem means connectable to the computer device and connected to the control means for processing the computer data signals transmitted between the computer device and the telephone network; and c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network, wherein the generic command signals include signals requesting telephone network access device status information.

4. A system for connecting a computer device for data transmission over a telephone network which can be accessed through a telephone network access device responsive to device-specific command signals to perform a network accessing function, comprising:

a. control means for controlling the transmission of computer data between the computer device and the telephone network and for generating a generic command signal representative of a desired telephone network access device network accessing function and transmitting the generic command signal over a command signal bus;

b. modem means connectable to the computer device and connected to the control means for processing the computer data signals transmitted between the computer device and the telephone network; and c. interface means selectively connectable between the modem means and control means and the telephone network access device for generating and tarnsmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network, wherein the interface means includes means for accepting bus designation information and selectively operates with one of a plurality of types of telephone network access devices depending on the bus designation information.

5. An interface for connecting a cellular data modem for transmission of computer data to a cellular telephone device, said cellular telephone device including a cellular bus, comprising:

a. analog interface means connectable between the cellular data modem and the cellular bus for transmitting signals representing computer data between the data modem and the cellular bus;

b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus, wherein the processing means further operates to receive cellular telephone device status indication signals from the cellular bus and provide signals indicative of cellular telephone device status to the cellular data modem.

6. An inerface for connecting a cellular data modem for tansmission of computer data to a cellular telephone device, said cellular telephone device including a cellular bus, comprising:

a. analog interface means connectable between the cellular data modem and the cellular bus for transmitting signals representing computer data between the data modem and the cellular bus;

b. processing means connectable to the cellular data moden and the cellular bus for receiving generic command signals from the cellular data modem, processing the generic command signals to generate device-specific cellular telphone control signals adapted to control operation of the specific cellular telephone device attached to the interface device, and transmitting the device-specific cellular telephone control signals to the cellular bus, said interface designed for use with a cellular bus comprising a control-unit-to-transceiver-unit (CU-TRU) cable connecting a cellular transceiver and a cellular control unit, wherein the interface means is connected to the cellular transceiver and to the cellular control unit so as to replace the CU-TRU cable of the cellular bus.

7. An interface for connecting a cellular data modem for transmission of computer data to a cellular telephone device, said cellular telephone device including a cellular bus, comprising:
 a. analog interface means connectable between the cellular data modem and the cellular bus for transmitting signals representing computer data between the data modem and the cellular bus;
 b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus, wherein the generic command signals are received as serial digital data on digital data lines separate from lines used to carry the signals representing computer data.

8. An interface for connecting a cellular data modem for transmission of computer data to a cellular telephone device, said cellular telephone device including a cellular bus, comprising:
 a. analog interface means connectable beween the cellular data modem and the cellular bus for transmitting signals representing computer data between the data modem and the cellular bus;
 b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus;
 c. acknowledgment means for acknowledging generic command signals received from the modem.

9. An interface for connecting a cellular data modem for transmission of computer data to a cellular telephone device, said cellular telephone device including a cellular bus, comprising:
 a. analog interface means connectable between the cellular data modem and the cellular bus for transmitting signals representing computer data between the data modem and the cellular bus;
 b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and tansmitting the device-specific cellular telephone control signals to the cellular bus, wherein the generic command signals processed by the processing means includes requesting that the processing means generate device-specific cellular telephone control signals emulating a keypress occurrence on a keypad of the cellular telephone device.

10. An interface for connecting a cellular data modem for transmission of computer data to a cellular telephone device, said cellular telephone device including a cellular bus, comprising:
 a. analog interface means connectable between the cellular data modem and the cellular bus for transmitting signals representing computer data between the data modem and the cellular bus;
 b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and tansmitting the device-specific cellular telephone control signals to the cellular bus, wherein the processing means includes means for accepting bus designation information and responds to the bus designation information to selectively operate with a plurality of types of cellular bus.

11. A system for accessing telephone networks through one of at least two types of telephone network access devices, both of types of telephone network access devices being designed to transmit analog telephonic data signals to the system and receive analog telephonic data signals from the system, with at least one of the types of the telephone network access devices being a digital type which is further capable of responding to separately trasmitted digital control signals from the system, comprising:
 a. analog telephonic data transmission means for transmitting information signals to and receiving information signals from the telephone network access device;
 b. digital control signal transmission means for transmitting digital control signals adapted to direct changes in operating modes of the connected telephone network access device;
 c. input means for receiving signals indicative of the operating mode of the connected telephone network access device desired by the user;
 d. control means connected to the digital control signal transmission means and to be input means for generating the digital control signals carried by the digital control signal transmission means;
 wherein the analog telephonic data tranmission means and the digital control signal transmission means are connectable to and mechanically disconnectable from the telephone network access device by the user through a single electrical connector compatible with both types of telephone network access devices, such that when the electrical connector is connected to a telephone network access device, the analog telephonic data transmission means is properly connected for communications with both types of telephone network access device, while the digital control signal transmission means will only function with the digital type of telephone network access device.

12. A modem for connecting a computer device to facilitate data transmission over one of at least two types of public communications networks which can be selectively accessed through associated communications network access devices connectable to the modem, comprising:
  control means for controlling the transmission of computer data between the computer device and the communications network access device, for selectively generating a generic command signal in digital form identifying a desired network access function of communications network access devices and for selectively transmitting said digital command signal to an interface external to the modem for controlling the connected communications network access device only when said connected communications network access device is of a type responding to digital control inputs; and
  modulation means connectable to the computer device and connected to the control means for processing computer data signals transmitted between the computer device and the communications network when the network has been accessed;
  wherein the digital command signal is a serial digital data transmission.

13. A modem for connecting a computer device to facilitate data transmission over one of at least two types of public communications networks which can be selectively accessed through associated communications network access devices connectable to the modem, comprising:
  control means for controlling the transmission of computer data between the computer device and the communications network access device, for selectively generating a generic command signal in digital form identifying a desired network access function of communications network access devices and for selectively transmitting said digital command signal to an interface external to the modem for controlling the connected communications network access device only when said connected communications network access device is of a type responding to digital control inputs; and
  modulation means connectable to the computer device and connected to the control means for processing computer data signals transmitted between the computer device and the communications network when the network has been accessed;
  wherein the digital command signal is one of a set of defined command signals forming a command language interpretable by said external interface.

14. A modem for connecting a computer device to facilitate data transmission over one of at least two types of public communications networks which can be selectively accessed through associated communications network access devices connectable to the modem, comprising:
  control means for controlling the transmission of computer data between the computer device and the communications network access device, for selectively generation a generic command signal in digital form identifying a desired network access function of communications network access devices and for selectively transmitting said digital command signal to an interface external to the modem for controlling the connected communications network access device only when said connected communications network access device is of a type responding to digital control inputs; wherein the control means operates to generate said digital control signals in a first operational mode for connecting to a first public communications network type and functions in a second operational mode to generate analog control signals during connection to a second public communications network type; and
  modulation means connectable to the computer device and connected to the control means for processing computer data signals transmitted between the computer device and the communications network when the network has been accessed.

15. A method for interfacing a computing device to one of a plurality of connectable access devices of one of two or more types of telephone networks, including a first network responding to analog dialing signals and a second network having digital dailing signals, comprising the steps of:
  (a) connecting an interface connector of the computing device to an interface connector of the access device to form first and second signal paths at the interface connector of the computing device;
  (b) determining whether the network responds to analog or digital dailing signals;
  (c) if the network responds to analog dialing signals, transmitting analog dialing signals and data signals on the first signal path;
  (d) if the network responds to digital dialing signals, transmitting digital dialing signals on the second signal path wherein the digital dialing signals transmitted in step (d) are signals representing commands in a standardized command language.

16. A process for establishing a data transmission communications link using a data transmission device which is connected through a connector to either a landline telephone line interface or to an accessing device interface associated with an accessing device for an alternate public communications network operating in response to a generic command language, comprising the steps of:
  a. dtermining, based on evaluation of signals at the connector, whether the device connected to the connector is the alternate network accessing device or the landline telephone line interface; and
  b. if a landline telephone line interface is connected,
    (i) generating landline hook and dialing signals and
    (ii) transmitting these signals through the connector to initiate a call; and
  c. if the alternate network accessing device is connected, (i) generating at least one digital command language signal representative of a desired communications link initiation function according to the predefined generic command language responded to by the accessing device interface, (ii) transmitting said digital command language signal through the connector to the accessing device interface and (iii) translating the generic command language signal to device-specific signals to cause the accessing device to perform the link initiation function defined by the generic command language signal.

17. A system for connecting a computer device for data transmission over a telephone network which can be accessed through a telephone network access device responsive to device-specific command signals to perform a network accessing function, comprising:

a. control means for controlling the transmission of computer data between the computer device and the telephone network and for generating a generic command signal representative of a desired telephone network access device network accessing function and transmitting the generic command signal over a command signal bus;

b. modem means connectable to the computer device and connected to the control means for processing the computer data signals transmitted between the computer device and the telephone network; and c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network;

wherein the interface means provides signals acknowledging receipt of commands from the control means.

18. The system of claim 17 wherein the control means retransmits commands that are not acknowledged by the interface means within a defined time period.

19. A system for connecting a computer device for data transmission over a telephone network which can be accessed through a telephone network access device responsive to device-specific command signals to perform a network accessing function, comprising:

a. control means for controlling the transmission of computer data between the computer device and the telephone network and for genrating a generic command signal representative of a desired telephone network access device network accessing function and transmitting the generic command signal over a command signal bus;

b. modem means connectable to the computer device and connected to the control means for processing the computer data signals transmitted between the computer device and the telephone network; and c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network, wherein the interface means further includes connection sensing means for sensing connection of the interface means to the modem means or the control means.

20. The system of claim 19 wherein the interface means, upon the sensing by the connection sensing means of the connection of the interface means to the control means, transmits a wakeup sequence signal to the control means to establish initial communications with the control means.

21. A system for connecting a computer device for data transmission over a telephone network which can be accessed through a telephone network access device responsive to device-specific command signal to perform a network accessing function, comprising:

a. control means for controlling the transmission of computer data between the computer device and the telephone network and for generating a generic command signal representative of a desired telephone network access device network accessing function and transmitting the generic command signal over a command signal bus;

b. modem means connectable to the computer device and connected to the control means for processing the computer data signals transmitted between the computer device and the telephone network; and c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network;

wherein the control means further includes cable connection sensing means for sensing connection of the interface means to the modem means or the control means.

22. The system of claim 21 wherein the control means, upon the sensing by the cable connecting sensing means of the connection of the interface means to the control means, transmits a wakeup sequence signal to the interface means to establish initial communications with the interface device.

23. An interface for connecting a cellular data modem for transmission of computer data to a cellular telephone device, said cellular telephone device including a cellular bus, comprising:

a. analog interface means connectable between the cellular data modem and the cellular bus for transmitting signals representing computer data between the data modem and the cellular bus;

b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus; and c. connection signal generating means for producing a connection signal which can be received by the data modem when the interface device is connected to the data modem.

24. The interface device of claim 23 which changes its state from a first operating mode to a second operating mode upon receipt of a preassigned wakeup sequence signal from the data modem subsequent to connection of the interface device to the data modem.

25. An interface circuit for connecting a computing device to any one of a plurality of access devices for one of a plurality of telephone networks, including a first network responding to analog dialing signals and a second network having digital dialing signals, comprising:
- a connecting device containing connections for first and second information busses for connecting a computing device to one of said access devices and which permits selective physical separation of, and disabling of signal transmission between, the computing device and the access device;
- control means for selectively causing transmission of dialing signals and data signals over the first information bus between the computing device and the access device, at least when the telephone network is a network responding to analog dialing signals, and for selective causing transmission over said second information bus, when the connected telephone network is a network operating with digital dialing signals, of digital control signals in a standardized command language adapted to cause dialing by the connected access device on said digital dialing network;
- wherein the connecting device is a standard modular telephone connector having a plurality of pins.

26. The interface circuit of claim 25 wherein the first information bus includes the pins of the connector normally used to transmit landline telephone signals in a single-line landline connection.

27. The interface circuit of claim 25 wherein the second information bus includes additional pins of the connector different from the pins used in the first information bus.

28. A system for connecting a computer device for data transmission over a telephone network which can be accessed through a telephone network access device responsive to device-specific command signals to perform a network accessing function, comprising:
- a. control means for controlling the transmission of computer data between the computer device and the telephone network and for generating a generic command signal representative of a desired telephone network access device network accessing function and transmitting the generic command signal over a command signal bus;
- b. modem means connectable to the computer device and connected to the control means for processing the computer data signals transmitted between the computer device and the telephone network; and
- c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network;
- wherein the system comprises at least two unitary component devices, a first device incorporating the modem means and the control means and a second device incorporating the interface means, and wherein the first device is provided with a standard landline telephone connector which may be selectively connected to a landline telephone jack for operation of the system with a landline telephone system or to a compatible connector of the second device for operation of the system with a cellular telephone system.

29. The system of claim 28 wherein the standard landline telephone connector is an RJ-11 connector.

30. The system of claim 28 wherein the modem means may be operated using a first data communications protocol when used with a cellular telephone network and may be operated using a second data communications protocol when used with a landline telephone network.

31. An interface for connecting a cellular data modem for transmission of computer data to a cellular telephone device, said cellular telephone device including a cellular bus, comprising:
- a. analog interface means connectable between the cellular data modem and the cellular bus for transmitting signals representing computer data between the data modem and the cellular bus;
- b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus;
- c. condition sensing means for receiving condition information from the cellular telephone device.

32. The device of claim 31 wherein the processing means may be selectively operated to transmit condition signals to the cellular data modem reflective of the cellular telephone device condition sensed by the condition sensing means.

33. The interface device of claim 32 wherein the generic command signals processed by the processing means include signals requesting cellular telephone device condition information.

34. The device of claim 32 wherein the processing means transmits an alert sequence signal to the cellular data modem in response to signals from the cellular telephone device indicative of an incoming call.

35. The device of claim 34 wherein the alert sequence signal is transmitted on a serial digital data line separate from the lines carrying the signals representing computer data.

36. An interface for connecting a cellular data modem for transmission of computer data to a cellular telephone device, said cellular telephone device including a cellular bus, comprising:
- a. analog interface means connectable between the cellular data modem and the cellular bus for transmitting signals representing computer data between the data modem and the cellular bus;
- b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus;
- wherein the connections of the interface device to the modem are made through a single connector including lines for carrying analog signals representing computer data and lines for carrying the separate generic command signals.

37. The interface device of claim 36 wherein the connector is a standard landline telephone connector.

38. The interface device of claim 37 wherein the analog signals are carried on the pins of the connector normally designated to carry landline analog telephone signals when the connector is used in a landline telephone system.

39. The interface device of claim 37 wherein the connector is a six-pin RJ-11 telephone connector and the analog signals are carried on pins three and four of the connector.

40. An interface for connecting a cellular data modem for transmission of computer data to a cellular telephone device, said cellular telephone device including a cellular bus, comprising:
   a. analog interface means connectable between the cellular data modem and the cellular bus for transmitting signals representing computer data between the data modem and the cellular bus;
   b. processing means connectable to the cellular data modem and the cellular bus for receiving generic command signals from the cellular data modem, processing the generic command signals to generate device-specific cellular telephone control signals adapted to control operation of the specific cellular telephone device attached to the interface device, and transmitting the device-specific cellular telephone control signals to the cellular bus; and
   c. connection sensing means for sensing connection of the interface device to the modem.

41. The interface device of claim 40 wherein the interface device, upon the sensing by the connection sensing means of the connection of the interface device to the data modem, transmits a wakeup sequence signal to the modem to establish initial communications with the modem.

42. The interface device of claim 40 adapted for use with a data modem that produces a connection signal on a communications line which is connected between the interface device and the data modem whenever the interface device is connected to the data modem, wherein the connection sensing means senses the connection signal and produces a signal when the interface device and the data modem have been connected.

43. A data modem which may be selectively used with either a landline telephone device or a cellular telephone device, comprising:
   a. modulation-demodulation means for encoding and decoding computer data to be transmitted between the computer device and a connected landline or cellular telephone device;
   b. analog data transmission lines connected to the modulation-demodulation means for carrying computer data between the modulation-demodulation means and the connected telephone device;
   c. cellular command signal generating means for generating generic command signals for a cellular telephone system according to a specified protocol;
   d. command transmission lines connected to the cellular command signal generating means for carrying generic command signals between the cellular command signal generating means and a command interpreting device connected to the command transmission lines,
   wherein the modem is connected either to the command interpreting device or to a landline telephone device through a common terminal connector means connected to the command transmission lines and the analog data transmission lines, said connector means selectively permitting physical and signal transmission separation of the modem from said command interpreting device or said landline telephone device.

44. The modem of claim 43 wherein the terminal connector means is a standard landline telephone connector.

45. The modem of claim 44 wherein the analog data transmission lines are connected to the pins of the landline telephone connector normally designated to carry landline analog telephone signals.

46. The modem of claim 44 wherein the terminal connector means is a six-pin RJ-11 telephone connector and the analog data transmission lines are connected to pins three and four of the connector.

47. A data modem for installation in a portable computer which may be selectively used with either a landline telephone device or a cellular telephone device, comprising:
   a. modulation-demodulation means for encoding and decoding computer data to be transmitted between the computer device and a connected landline or cellular telephone device;
   b. cellular command signal generating means for generating command signals for a cellular telephone system according to a specified protocol;
   c. connector means connected to the command signal generating means and the modulation-demodulation means for providing computer data signals and operational command signals to an interface cable connecting the modem to either a cellular or landline telephone device, said connector means permitting selective physical and signal transmission separation of the data modem from said interface cable, wherein the connector means is a single standard landline telephone connector.

48. The data modem of claim 47 wherein the modulation-demodulation means is connected to the pins of the landline telephone connector normally designated to carry landline analog telephone signals when the landline telephone connector is used in a single-line landline telephone system.

49. The data modem of claim 47 wherein the connector means is a single six-pin RJ-11 telephone connector and the modulation-demodulation means is connected to pins three and four of the connector.

50. A system for connecting a computer device for data transmission over a telephone network which can be accessed through a telephone network access device responsive to telephone network access device-specific command signals to perform a network accessing function, comprising:
   modem means for receiving data and control signals from the computer device and controlling in response a connection to a telephone network for transmission of data between the computer device and the telephone network, said modem means comprising control means for controlling the transmission of computer data between the computer device and the telephone network and for selectively generating a generic command signal in digital from representative of a desired network accessing function of telephone network access devices, and further comprising modulation means connectable to the computer device and connected to the control means for processing computer data signals transmitted between the computer device and the telephone network, and further comprising connector means for selectively connecting and disconnecting external devices to said modem means for the transmission of said generic command signals and said computer data signals, said connector means permitting selective physical and signal transmission separation of the modulation means from said external devices; and interface means connected with the telephone network access device and selectively connectable to the connector means of the modem means for receiving the generic command signals of the modem means and translating said signals into device-specific digital command signals compatible with at least the particular telephone network access device in use and adapted to initiate said network accessing function of the telephone network access device, and for receiving and transmitting the computer data signals between the modem means and the telephone network access device.

51. The system of claim 50 wherein the generic command signal is one of a set of defined command signals forming a command language, and wherein the interface means performs its translation function by interpreting the signals of the command language and generating in response thereto the device-specific digital command signals appropriate to the telephone network access device.

52. The system of claim 50 wherein the connector means comprise a standardized connector provided with first connecting means for the computer data signals and second, separate connecting means for the generic command signals.

53. The system of claim 52 wherein the standardized connector is a standard telephone connector, and wherein the first connecting means carrying computer data signals are pins used for carrying analog telephone signals when the standard telephone connector is used in a landline telephone network.

54. The system of claim 53 wherein the connector is an RJ-11 connector having up to six pins and the first connecting means comprises pins 3 and 4.

55. A modem for connecting a computer device to facilitate data transmission over one of at least two types of public communications networks which can be selectively accessed through associated communications network access devices connectable to the modem, comprising:

modulation means connectable to the computer device for processing computer data signals transmitted between the computer device and the communications network when a connection of the modem to a device on the communications network has been established;

unitary connector means adapted to permit selective connection of the modem to a communications network access device, for providing connections for at least two information busses between the modem and an interface of the communications network access device, with a first of said information busses connected to and used by the modulation means for transmission of the computer data signals, with said unitary connector means also permitting disconnection of the modem from the interface enabling physical and signal connection separation of the modem from the interface;

control means connected to the modulation means and connectable to the computer device for generating and transmitting through the connector means control signals specifying desired call establishment and termination functions of the connected communications network access device and having plural modes of operation, including a first operational mode in which said control signals are transmitted over the same first information bus as the computer data signals and a second operational mode in which the control signals are transmitted on the second of the two information busses of said connector means.

56. The modem of claim 55, wherein the second operational mode of the control means the digital control signals include signals which are elements of a defined set of command signals forming a command language.

57. The modem of claim 55 wherein the connector means is a standard landline telephone connector.

58. The modem of claim 57 wherein the first transmission path includes the pins of the connector normally designated to carry landline analog telephone signals when the connector is used in a landline telephone system.

59. The modem of claim 58 wherein the connector is an RJ-11 telephone connector path includes the third and fourth pins.

60. A modem for connecting a computer device to facilitate data transmission over one of at least two types of public communications networks which can be selectively accessed through associated communications network access devices connectable to the modem, comprising:

a standardized connector for selectively making a connection to any one of said communications network access devices and permitting selective physical and signal transmission separation of the modem from said communications network access device;

control means for generating and transmitting through the connector control signals specifying desired call establishment functions of a connected communications network access device and having plural modes of operation, including a first operational mode in which said control signals are analog signals and a second operational mode in which said control signals are in digital form;

modulation means connectable to the computer device and connected to the control means for processing the computer data signals transmitted between the computer device and the communications network when a connection of the modem to a device on the communications network has been established.

61. The modem of claim 60, wherein the second operational mode of the control means the digital control signals include signals which are elements of a defined set of command signals forming a command language.

62. The modem of claim 60 wherein the control means operates in its first mode when the modem is connected to a communications network access device associated with a first type of network and operates in its second mode when the modem is connected to a communications network access device associated with a second type of network and responsive to digital command signals to perform call placement functions.

63. The modem of claim 62 wherein the first type of network is a landline network and the second type of network is a cellular telephone network.

64. The modem of claim 62 wherein connections in the first type of network are made using analog control signals generated by the associated telephone network access device and wherein connections in the second type of network are made in response to digital control signals generated by the associated telephone network access device.

65. The modem of claim 62 wherein the standardized connector comprises two sets of connection means selectively connectable to an interface of one of the communications network access devices, a first set of connection means for transmitting computer data signals and control signals and a second set of connection means separate from the first for selectively transmitting control signals.

66. The modem of claim 65 wherein in the first operational mode of the control means both the control signals and the computer data signals are transmitted through the first set of connection means, while in the second operational mode of the control means the computer data signals are transmitted through the first set of connection means and the control signals are transmitted through the second connection means.

67. The modem of claim 66 wherein the first and second sets of connection means are contained in a standard landline telephone connector.

68. The modem of claim 67 wherein the first connection means are the pins of the connector normally designated to carry landline analog telephone signals when the connector is used in a landline telephone system.

69. The modem of claim 68 wherein the connector is an RJ-11 telephone connector having up to six pins and the first connection means comprises the third and fourth pins.

70. A data modem adapted for use with a computer device and a cellular telephone device, said cellular telephone device having a cellular bus, comprising:
   a. modulation-demodulation means for encoding and decoding data to be transmitted in a first of two separate information busses between the computer device and the cellular telephone device;
   b. command signal generating means for generating generic command signals representing a desired cellular telephone device network connection function, the generic command signals being generated independently of the characteristics of the cellular bus of the cellular telephone device to which the modem is connected and transmitted over the second said information bus.

71. The data modem of claim 70 wherein the generic command signals include signals adapted to induce generation on the cellular bus or keypress signals indicative of the pressing of a key on a keyboard of the cellular telephone device.

72. The data modem of claim 70 wherein the data modem is further adapted for selective use with a landline telephone access device.

73. The data modem of claim 72 wherein the modem means may be operated using a first data communications protocol when used with a cellular telephone device and a second data communications protocol when used with a landline telephone access device.

74. The data modem of claim 70 wherein the data modem includes command signal receiving means for receiving generic command signals from a device associated with the cellular bus, and wherein the command signals include signals requesting cellular telephone device status information.

75. The data moden of claim 74 wherein the modem generates signals acknowledging receipt of cellular telephone device status information.

76. The data modem of claim 70 further including connection signal generating means for inducing a signal in an external device associated with the cellular telephone device upon connection of the external device to the data modem.

77. The data modem of claim 76 wherein the modem responds to signals generated by the external device upon connection of the external device to the data modem to complete a wakeup sequence.

78. The data modem of claim 70 further including connection signal sensing means for indicating that an external device associated with the cellular telephone device has been connected to the modem when a signal induced by the external device is sensed by the connection signal sensing means.

79. The data modem of claim 78 wherein the modem transmits wakeup sequence signals to the external device folowing connection of the external device to the modem.

80. The data modem of claim 70 wherein the modem further includes command signal receiving means for receiving generic command signals from a device associated with the cellular bus, in which the command signal receiving means is adapted to receive an acknowledgment signal following transmission by the modem of a generic command signal to the device associated with the cellular bus.

81. The data modem of claim 80 wherein the modem operates to retransmit generic command signals if an acknowledgement signal is not received by the command signal receiving means after transmission of the generic command signal.

82. A system for connecting a computer device for data transmission over a telephone network which can be accessed through a telephone network access device responsive to device-specific command signals to perform a network accessing function, comprising:
   a. control means for controlling the transmission of computer data between the computer device and the telephone network and for generating a generic command signal representative of a desired telephone network access device network accessing function and transmitting the generic command signal over a command signal bus;
   b. modem means connectable to the computer device and connected to the control means for processing the computer data signals transmitted between the computer device and the telephone network; and
   c. interface means selectively connectable between the modem means and control means and the telephone network access device for generating and transmitting device-specific command signals compatible with at least the particular telephone network access device in use and adapted to control said network accessing function of the telephone network access device in response to generic command signals received from the control means through said command signal bus, and including a bus separate from said command signal bus for transmitting data between the modem means and the telephone network;
   wherein the telephone network access device is a cellular telephone.

83. The system of claim 82 wherein the system comprises at least two unitary component devices, a first device incorporationg the modem means and the control means a second device incorporating the interface means.

84. The system of claim 82 wherein the generic command signals include signals requesting that the interface means generate device-specific command signals emulting a keypress occurrance on a keypad of the cellular telephone.

85. The system of claim 82 wherein the cellular telephone includes a cellular transceiver and a cellular control unit and the interface means is connected individually to both the cellular transceiver and the cellular control unit.

86. The system of claim 85 wherein the connections of the interface means to the cellular transceiver and the cellular control unit replace a cellular bus cable which normally connects the transceiver to the control unit, so as to convey cellular bus signals normally carried by the said cellular bus cable.

87. The system of claim 82 wherein the interface means further includes condition sensing means for receiving device condition information from the cellular telephone and wherein the interface means includes response means for selectively providing signals based on the said device condition information to the control means.

88. The system of claim 87 wherein the control means provides signals acknowledging receipt of device condition information from the interface means.

89. The system of claim 82 wherein the generic command signals generated by the control means are transmitted to the interface means using digital tansmission means.

90. The system of claim 89 wherein the data transmitted between the modem means and the telephone network is carried on transmission lines separate from the digital transmission means carrying generic commands signals between the control means and the interface means.

91. The system of claim 89 wherein the digital transmission means is at least one serial digital data line.

* * * * *

UNITED STATES PATENT AND TRADEMARK OFFICE
CERTIFICATE OF CORRECTION

PATENT NO. : 5,127,041
DATED : June 30, 1992
INVENTOR(S) : O'Sullivan

It is certified that error appears in the above-identified patent and that said Letters Patent is hereby corrected as shown below:

```
Col. 22, Claim 4,  line 20, replace "tarnsmitting" with --transmitting--.
Col. 22, Claim 6,  line 2, replace "tansmission" with --transmission--;
                   also line 10, replace "moden" with --modem--.
Col. 24, Claim 9,  line 16, replace "tansmitting" with --transmitting--.
Col. 24, Claim 11, line 3, after "of", add --the-- before "type",
                   also line 23, replace "be" with --the--.
Col. 25, Claim 14, line 10, replace "generation" with --generating--.
Col. 26, Claim 15, line 5, replace "dailing" with --dialing--,
                   also line 12, replace "dailing" with --dialing--.
Col. 26, Claim 16, line 9, replace "dtermining" with --determining--.
Col. 32, Claim 50, line 16, replace "from" with --form--.
Col. 34, Claim 56, line 1, after "wherein", insert --in--.
Col. 34, Claim 59, line 2, after "connector", insert --having up to six
                   pins and the first transmission--.
Col. 34, Claim 61, line 1, after "wherin", insert --in--.
Col. 35, Claim 71, line 3, replace "or" with --of--.
Col. 36, Claim 79, line 3, replace "folowing" with --following--.
Col. 37, Claim 84, line 4, replace "emulting" with --emulating--.
```

Signed and Sealed this

Twenty-third Day of November, 1993

BRUCE LEHMAN

*Attest:*

*Attesting Officer*        *Commissioner of Patents and Trademarks*